US010630406B2

(12) United States Patent
Lee et al.

(10) Patent No.: US 10,630,406 B2
(45) Date of Patent: Apr. 21, 2020

(54) METHOD FOR PROVIDING MOBILE COUPON AND MOBILE ELECTRONIC DEVICE SUPPORTING THE SAME

(71) Applicant: Samsung Electronics Co., Ltd., Suwon-si, Gyeonggi-do (KR)

(72) Inventors: Ha Na Lee, Seoul (KR); Ji Hea Park, Seoul (KR); Se Jun Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1006 days.

(21) Appl. No.: 14/470,020

(22) Filed: Aug. 27, 2014

(65) Prior Publication Data

US 2015/0066622 A1 Mar. 5, 2015

(30) Foreign Application Priority Data

Sep. 3, 2013 (KR) .................. 10-2013-0105414

(51) Int. Cl.
*G06Q 30/02* (2012.01)
*H04H 20/59* (2008.01)
*H04N 21/235* (2011.01)
*H04N 21/61* (2011.01)
*H04N 21/488* (2011.01)
(Continued)

(52) U.S. Cl.
CPC ......... *H04H 20/59* (2013.01); *H04L 65/4076* (2013.01); *H04N 21/235* (2013.01); *H04N 21/27* (2013.01); *H04N 21/4126* (2013.01); *H04N 21/4302* (2013.01);
(Continued)

(58) Field of Classification Search
CPC .......... G06Q 30/0207; G06Q 30/0222; G06Q 30/0224; G06Q 30/0225; G06Q 30/0239; G06Q 30/0255; G06Q 30/0267

USPC .......... 705/14.1, 14.23, 14.25, 14.26, 14.39, 705/14.53, 14.64
See application file for complete search history.

(56) References Cited

U.S. PATENT DOCUMENTS

| | | | |
|---|---|---|---|
| 6,973,505 B1 * | 12/2005 | Schneider | G06F 16/9566 709/245 |
| 2005/0144074 A1 * | 6/2005 | Fredregill | G06Q 20/102 705/14.27 |

(Continued)

FOREIGN PATENT DOCUMENTS

| | | |
|---|---|---|
| KR | 10-0936254 B1 | 1/2010 |
| KR | 10-2010-0124952 A | 11/2010 |

(Continued)

OTHER PUBLICATIONS

Korean Office Action dated Feb. 13, 2020, issued in Korean Patent Application No. 10-2013-0105414.

*Primary Examiner* — Scott D Gartland
(74) *Attorney, Agent, or Firm* — Jefferson IP Law, LLP

(57) ABSTRACT

A method for providing a mobile coupon in a mobile electronic device is provided. The method includes collecting information about the mobile coupon including a domain to which the mobile coupon is applicable, from a mobile coupon image including the mobile coupon, determining whether the domain to which the mobile coupon is applicable is identical with a domain of a web site accessed by the mobile electronic device and outputting, when the domain to which the mobile coupon is applicable is identical with a domain of a web site accessed by the mobile electronic device, the information about the mobile coupon.

15 Claims, 22 Drawing Sheets

(51) Int. Cl.
*H04N 21/41* (2011.01)
*H04N 21/27* (2011.01)
*H04L 29/06* (2006.01)
*H04N 21/43* (2011.01)
*H04N 21/858* (2011.01)
*H04L 29/08* (2006.01)

(52) U.S. Cl.
CPC ..... *H04N 21/4882* (2013.01); *H04N 21/6112* (2013.01); *H04N 21/8586* (2013.01); *H04L 67/02* (2013.01)

(56) References Cited

U.S. PATENT DOCUMENTS

| | | | | |
|---|---|---|---|---|
| 2006/0206376 | A1* | 9/2006 | Gibbs | G06O 30/02 705/14.13 |
| 2012/0323664 | A1* | 12/2012 | Klems | G06Q 30/02 705/14.26 |
| 2013/0091463 | A1* | 4/2013 | Nordstrom | G06F 17/30905 715/810 |
| 2013/0110603 | A1 | 5/2013 | Chi | |
| 2014/0278881 | A1* | 9/2014 | Mann | G06Q 30/0225 705/14.26 |

FOREIGN PATENT DOCUMENTS

| KR | 10-1238224 | B1 | 3/2013 |
|---|---|---|---|
| KR | 10-2013-0045983 | A | 5/2013 |
| KR | 10-2013-0087468 | A | 8/2013 |

\* cited by examiner

FIG. 9
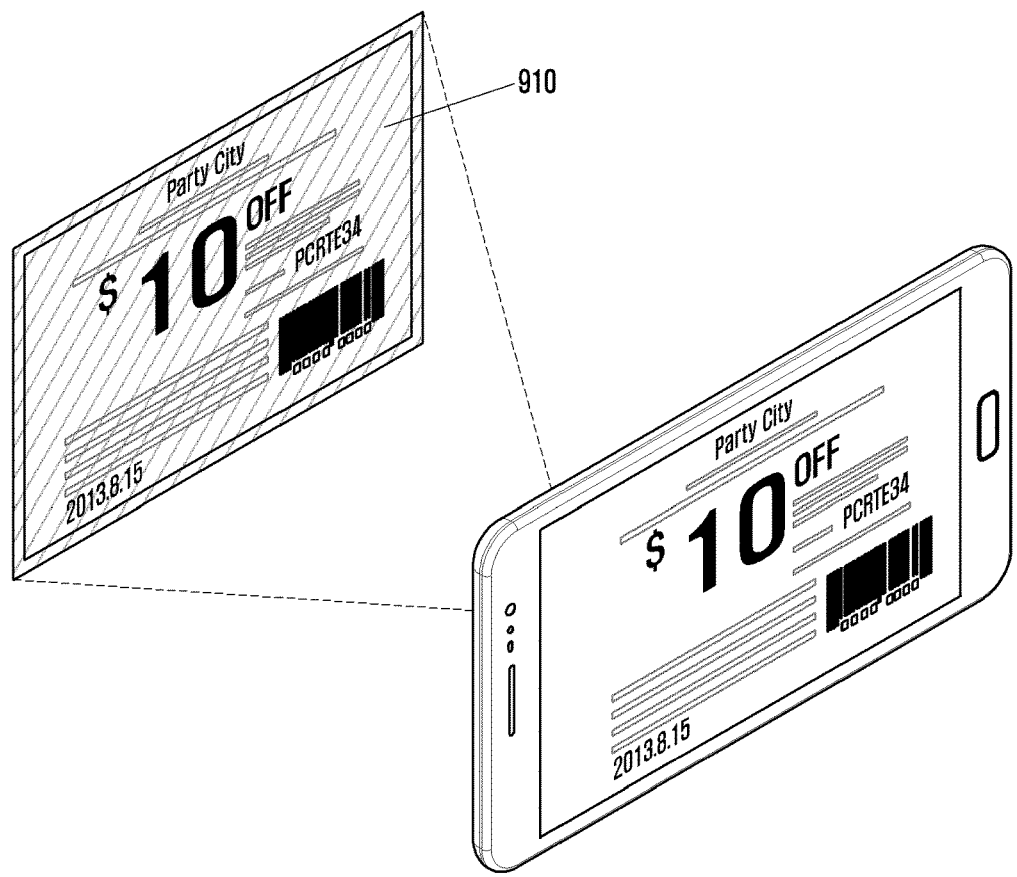
<901>
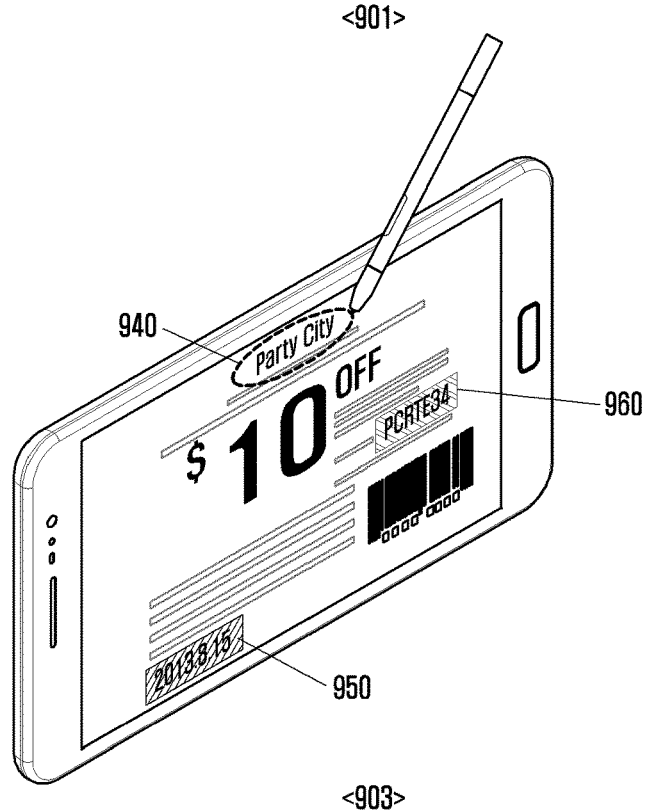
<903>

FIG. 12
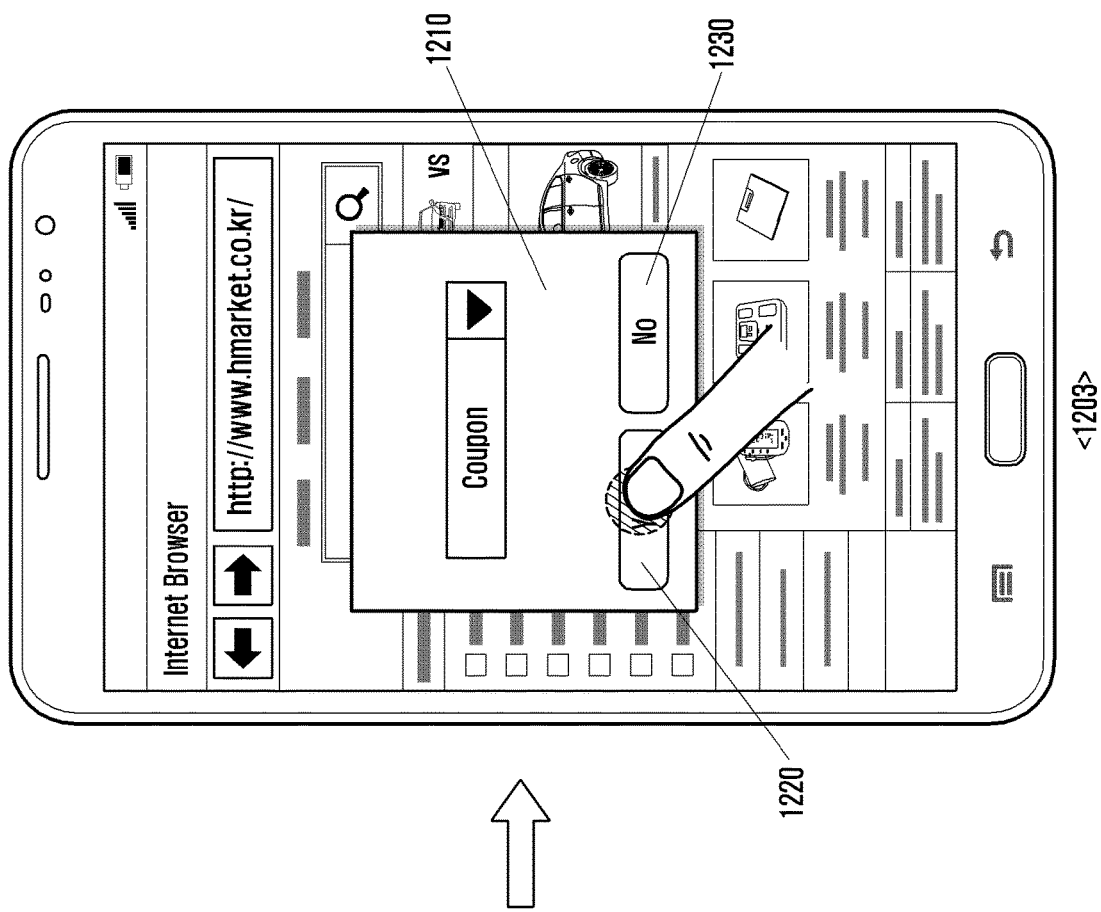
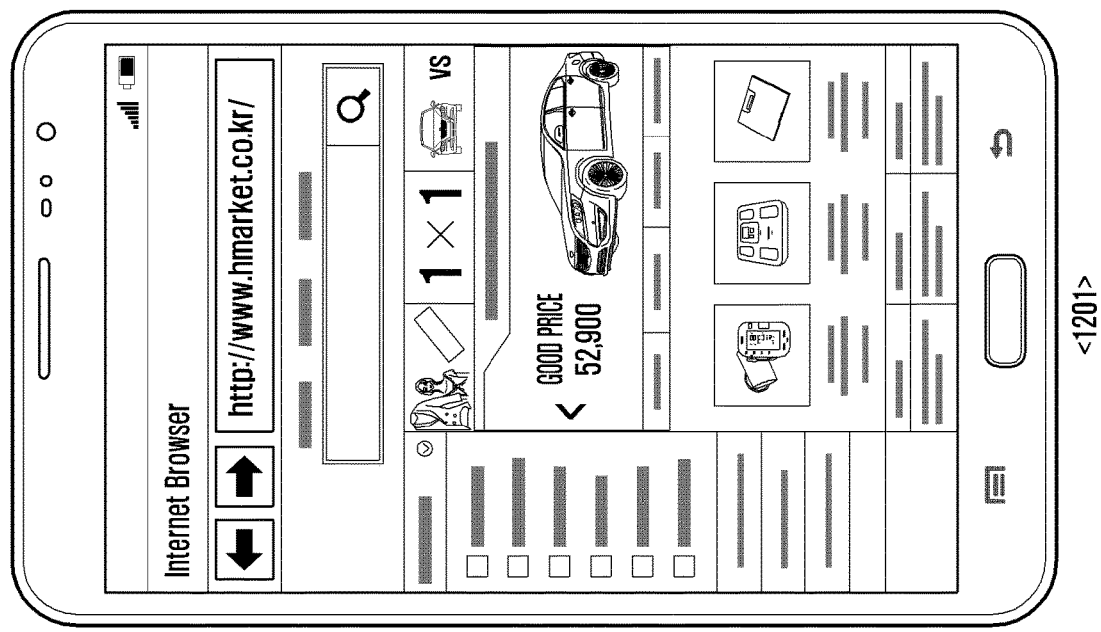

FIG. 13
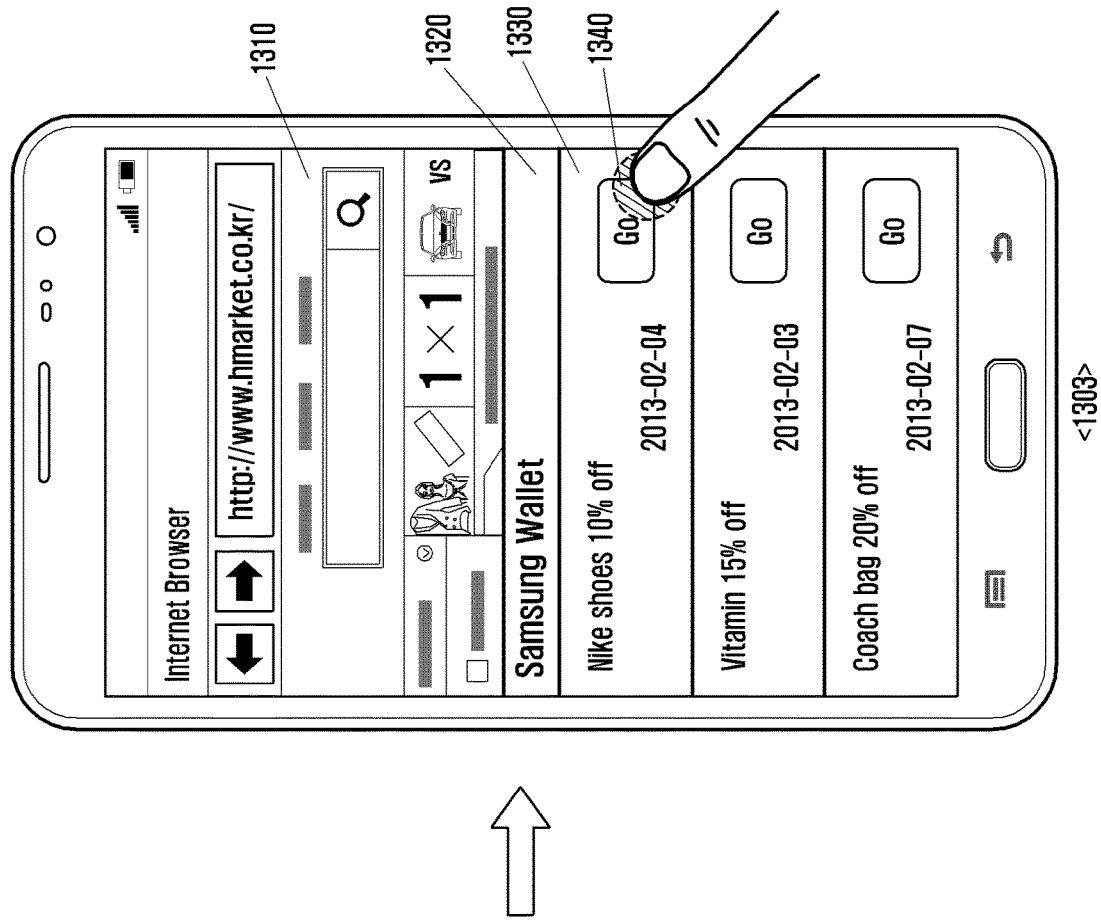
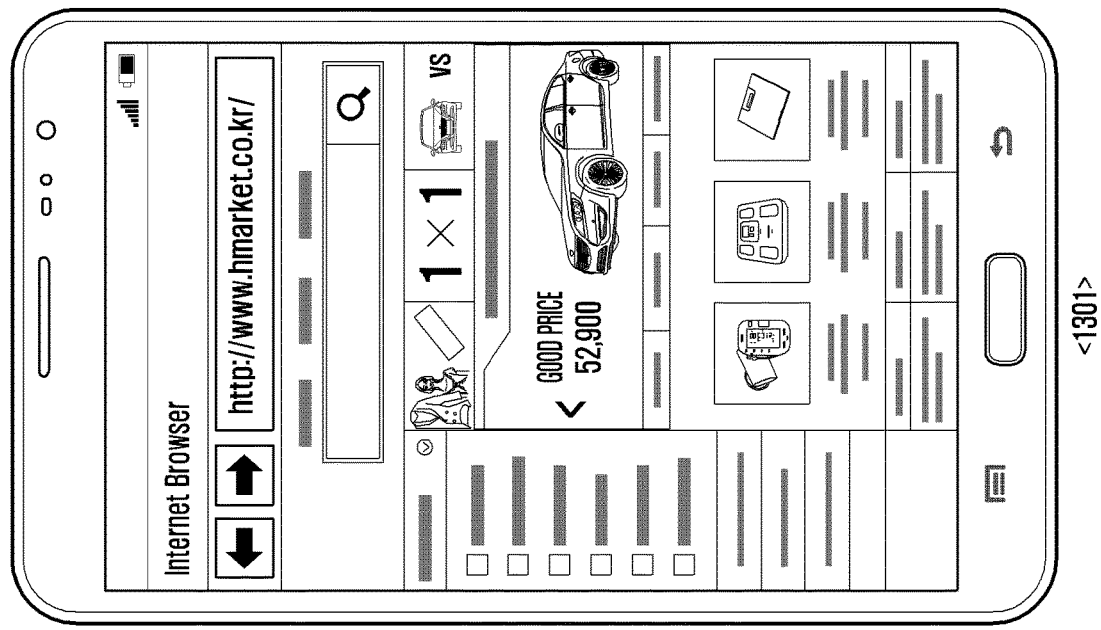

METHOD FOR PROVIDING MOBILE COUPON AND MOBILE ELECTRONIC DEVICE SUPPORTING THE SAME

CROSS-REFERENCE TO RELATED APPLICATION(S)

This application claims the benefit under 35 U.S.C. § 119(a) of a Korean patent application filed on Sep. 3, 2013 in the Korean Intellectual Property Office and assigned Serial number 10-2013-0105414, the entire disclosure of which is hereby incorporated by reference.

TECHNICAL FIELD

The present disclosure relates to a method for providing a mobile coupon. More particularly, the present disclosure relates to a method for providing a mobile coupon and a mobile electronic device supporting the same, which support the collection of mobile coupons and the output of coupons.

BACKGROUND

Mobile electronic devices have become a necessity due to their high portability and have developed into multimedia devices that provide various services, such as voice and video call functions, information input and output functions, a camera function, data transmission and reception, and the like. Furthermore, a mobile electronic device that integrates and supports various user functions has recently emerged. Accordingly, e-commerce using a portable electronic device has becomes possible, and the volume and form of e-commerce have also diversified.

As e-commerce becomes possible as described above, e-commerce business operators are issuing mobile coupons in order to facilitate the selling of products and increase competitiveness against other business operators. The mobile coupon is also called a coupon code, a promotion code, a shopping code, a discount code, and the like. A user may download a mobile coupon from the server of a mobile coupon selling-dedicated business operator or the server of a corresponding product seller, and may store the downloaded mobile coupon in his or her mobile electronic device.

In contrast, when a user attempts to use a plurality of mobile coupons stored in his or her mobile electronic device, the user may feel inconvenienced because the user needs to access a corresponding web page, separately search for a mobile coupon that is applicable to the web page, and directly input a mobile coupon code to the web page although the mobile coupon has been searched. Furthermore, it is difficult to search for a mobile coupon that is included in an e-mail or a text message received from an Internet site to which a user has subscribed if the mobile coupon is not separately stored.

Therefore, a need exists for a method for providing a mobile coupon and a mobile electronic device supporting the same to collect information about mobile coupons that are downloaded over the Internet from e-mail and text messages, to search for information about a mobile coupon stored in a mobile electronic device, and to output information about a retrieved mobile coupon to a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect the present disclosure is to provide a method for providing a mobile coupon and a mobile electronic device supporting the same to collect information about mobile coupons, determine whether a mobile coupon is applicable to an accessed web site, and provide support so that information about the mobile coupon is output if, as a result of the determination, the mobile coupon is determined to be applicable to the web site.

In accordance with an aspect of the present disclosure, a method for providing a mobile coupon in a mobile electronic device is provided. The method includes collecting information about the mobile coupon including a domain to which the mobile coupon is applicable, from a mobile coupon image including the mobile coupon, determining whether the domain to which the mobile coupon is applicable is identical with a domain of a web site accessed by the mobile electronic device and outputting, when the domain to which the mobile coupon is applicable is identical with a domain of a web site accessed by the mobile electronic device, the information about the mobile coupon.

In accordance with another aspect of the present disclosure, a mobile electronic device is provided. The mobile electronic device includes a communication unit configured to access a web site, and to receive an e-mail and a text message, a display unit configured to output a mobile coupon image including a mobile coupon and information about the mobile coupon and a control unit configured to collect the information about the mobile coupon including a domain to which the mobile coupon is applicable from the mobile coupon image, to determine whether the domain to which the mobile coupon is applicable is identical with a domain of the accessed web site, and to control the display unit to output, when the domain to which the mobile coupon is applicable is identical with a domain of a web site accessed by the mobile electronic device, the information about the mobile coupon.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram illustrating a method for collecting, by a mobile electronic device, a mobile coupon according to an embodiment of the present disclosure;

FIG. 12 is a diagram illustrating a method for outputting, by a mobile electronic device, a mobile coupon according to an embodiment of the present disclosure;

FIG. 13 is a diagram illustrating a method for outputting, by a mobile electronic device, a mobile coupon according to an embodiment of the present disclosure.

Throughout the drawings, it should be noted that like reference numbers are used to depict the same or similar elements, features, and structures.

DETAILED DESCRIPTION

Figure 1:
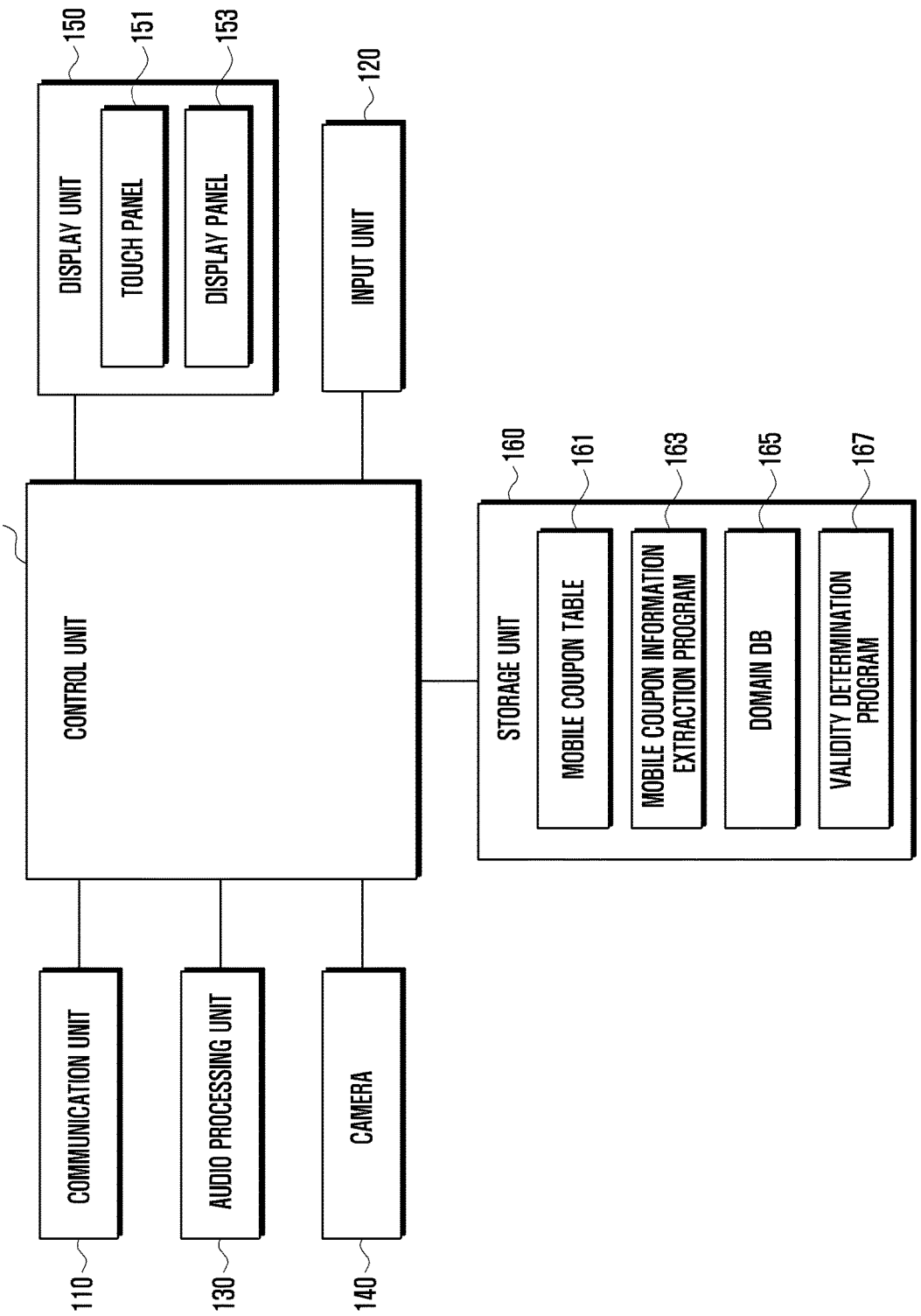
FIG. 1 is a diagram illustrating a construction of a mobile electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In embodiments of the present disclosure, an electronic device may include all types of information communication devices and multi-media devices and application devices thereof, such as a Portable Multimedia Player (PMP), a digital broadcasting player, a Personal Digital Assistant (PDA), a music player (e.g., a Motion Pictures Expert Group (MPEG-1 or MPEG-2) Audio Layer 3 (MP3) player), a portable game terminal, a smart phone, a notebook, a handheld Personal Computer (PC), and the like, in addition to all of mobile communication terminals that operate in accordance with communication protocols corresponding to various communication systems.

In describing the embodiments of the present disclosure, a description of contents that are well known in the art to which this specification pertains and are not directly related to this specification is omitted. Furthermore, a description of elements having the same construction and function is omitted.

For the same reason, in the accompanying drawings, some elements are enlarged, omitted, or depicted schematically. Furthermore, the size of each element does not accurately reflect its real size. Accordingly, various embodiments of the present disclosure are not restricted by the relative sizes or spaces that are drawn in the figures.

FIG. 1 is a diagram illustrating a construction of a mobile electronic device according to an embodiment of the present disclosure.

Referring to FIG. 1, a mobile electronic device 100 may include a communication unit 110, an input unit 120, an audio processing unit 130, a camera 140, a display unit 150, a storage unit 160, and a control unit 170.

The communication unit 110 may perform voice calls, video calls, or data communication with external devices over a network under the control of the control unit 170. The communication unit 110 may include a frequency transmitter configured to perform up-conversion and amplification on the frequency of a transmitted signal and a frequency receiver configured to perform low-noise amplification and down-conversion on the frequency of a received signal. The mobile electronic device 100 may access the web site of a coupon selling-dedicated business operator or a product seller through the communication unit 110, and may collect information about mobile coupons. In this case, the information about the mobile coupon may include a mobile coupon code, information about a brand and a domain to which the mobile coupon is applied, the effective date of the mobile coupon, the discount rate of the mobile coupon and/or coupon use conditions. Furthermore, the mobile electronic device 100 may collect information about mobile coupons from various applications in addition to e-mail or text messages received through the communication unit 110.

The communication unit 110 may support a specific short-range communication protocol (e.g., Wireless Fidelity (Wi-Fi), Bluetooth (BT), Near Field Communication (NFC)) or specific network communication (e.g., the Internet, a Local Area Network (LAN), a Wide Area Network (WAN), a telecommunication network, a cellular network, a satellite network, Plain Old Telephone Service (OTS), and the like).

The input unit 120 is an element configured to generate various input signals for the operation of the mobile electronic device 100. The input unit 120 may include various types of input units, such as a keyboard, a keypad, a key button, and the like, depending on whether the various types of input units are compatible with the mobile electronic device 100. Furthermore, the input unit 120 may be configured in the form of a touch map that is output to a touch screen if the display unit 150 is provided in a touch screen form. In an embodiment of the present disclosure, input for activating mobile coupon collection mode is possible through the input unit 120. Furthermore, when a soft button for a mobile coupon item displayed in response to the input of a menu button is input, information about a mobile coupon collected by and stored in the mobile electronic device 100 may be output.

The audio processing unit 130 may perform the input and output of an audio signal (e.g., voice data) for voice recognition, voice recording, digital recording, and calls while operating in conjunction with a speaker and a microphone. The audio processing unit 130 may receive an audio signal from the control unit 170, convert the received audio signal into an analog signal (i.e., D/A conversion), amplify the analog signal, and output the amplified signal to the speaker. The audio processing unit 130 may convert an audio signal received from the microphone into a digital signal (i.e., A/D conversion), and may provide the digital signal to the control unit 170. The speaker may convert an audio signal received from the audio processing unit 130 into sound waves, and may output the sound waves. The microphone may convert sound waves, transferred to a person or another sound source, into an audio signal. When a region including an image and text indicative of information about a mobile coupon (hereinafter referred to as a "mobile coupon information region") is selected in response to a user input, for example, by a finger or an electronic pen in order to collect the information about the mobile coupon, the audio processing unit 130 may output a corresponding audio signal. Furthermore, if animation is output from a mobile coupon information region when information about a mobile coupon, for example, mobile coupon code, a domain to which the mobile coupon is applicable, and the effective date of the mobile coupon are stored in the mobile electronic device 100, the audio processing unit 130 may output an audio signal corresponding to the animation. Furthermore, when accessing a web site having the same domain as a domain to which a mobile coupon is applicable, the audio processing unit 130 may output an audio signal that provides notification of that the mobile coupon applicable to the mobile electronic device 100 has been stored.

The camera 140 may capture images and moving images, and may include one or more image sensors (e.g., a front lens or a rear lens), an Image Signal Processor (ISP), and a flash Light Emitting Diode (LED) depending on implementation examples. The camera 140 may photograph a mobile coupon that is issued in a printed form, such as paper, off-line under the control of the control unit 170. The mobile coupon photographed under the control of the control unit 170 may be converted into an image form. Information about the mobile coupon may be extracted from the mobile coupon converted into the image form, like information about a mobile coupon collected from a web site, an e-mail, a text message, and the like.

The display unit 150 may provide various screens for the operation of the mobile electronic device 100. For example, the display unit 150 may support a standby screen and a menu screen for the operation of the mobile electronic device 100. The display unit 150 may include a touch panel 151 and a display panel 153. The touch panel 151 may be placed on the display panel 153. More specifically, the touch panel 151 may be implemented in an add-on type in which the touch panel 151 is placed on the display panel 153 or in an on-cell type or in-cell type in which the touch panel 151 is inserted into the display panel 153.

The touch panel 151 may generate a touch event in response to a user's gesture for a screen, may convert the touch event into an Analog to Digital (AD) signal, and may transfer the AD signal to the control unit 170. Such a touch panel 151 may be a complex touch panel that includes a hand touch panel configured to detect a hand gesture and a pen touch panel configured to detect a pen gesture. In this case, the hand touch panel may be implemented in a capacitive type. In some embodiments of the present disclosure, the hand touch panel may be implemented in a resistive type, an infrared type, an ultrasonic type, and the like. Furthermore, the hand touch panel does not generate a touch event in response to a hand gesture, but may generate a touch event in response to another object, for example, an object made of conductive materials capable of applying a change in the capacitance. The pen touch panel may also be formed in an electromagnetic induction type. In this case, the pen touch panel may generate a touch event through a pen for a touch that has been specially fabricated so that a magnetic field is formed. Furthermore, the touch panel 151, for example, the pen touch panel 151 may be disposed under the display panel 153, and may be configured to support electromagnetic induction generated by a coil included in an electronic pen. In order to detect the electromagnetic induction of the coil and induced electromagnetism, specific voltage or current may be supplied to the pen touch panel 151 under the control of the control unit 170.

In an embodiment of the present disclosure, the touch panel 151 may receive input for selecting a mobile coupon information region with respect to an image of a mobile coupon that is displayed in a web site, an e-mail, a text message, and the like. For example, the touch panel 151 may receive input for extracting the domain, mobile coupon code, and effective date of a mobile coupon through an electronic pen with respect to an image of the mobile coupon. For another example, the touch panel 151 may receive input of a looped curve form through an electronic pen with respect to a region that includes a domain or a trademark image output to an image of a mobile coupon, and may transfer the received input to the control unit 170. The control unit 170 may perform control so that the domain to which the mobile coupon is applicable is extracted based on the input received from the touch panel 151. Furthermore, the touch panel 151 may receive input of a type that is written along mobile coupon code displayed on a mobile coupon using an electronic pen, for example, or input of a type in which color is input or a line is drawn with respect to mobile coupon code according to an electronic pen input method, and may transfer the received input to the control unit 170. The control unit 170 may perform control so that the mobile coupon code is extracted based on the input received from the touch panel 151.

The display panel 153 may display data on a screen under the control of the control unit 170. For example, when the control unit 170 processes (e.g., decodes) data and stores the data in a buffer, the display panel 153 may convert the stored data into an analog signal and display the converted data on a screen. The display panel 153 may output various screens for collecting mobile coupons. For example, the display panel 153 may display an image of a mobile coupon on the entire screen, and may also output a domain to which a mobile coupon is applicable, mobile coupon code, and the effective date of the mobile coupon, that is, the detailed items of information about the mobile coupon, on one side of a screen, in the form of buttons having different colors. Furthermore, the display panel 153 may output a window for displaying a mobile coupon information region selected from a web site and a window for displaying a region in which information about a mobile coupon is stored at the same time in a multi-window way under the control of the control unit 170.

Furthermore, when the domain of a web site corresponding to information about a mobile coupon stored in the mobile electronic device 100 is accessed, the display panel 153 may output various screens for providing notification of such access. For example, when a web site is accessed under the control of the control unit 170, the display panel 153 may output information about a mobile coupon in the form of a notification panel, a soft button, a pop-up window and/or a multi-window if it is determined that the same domain as that of the accessed web site is stored in the mobile electronic device 100.

Furthermore, the display panel 153 may output a screen for determining the validity of a mobile coupon stored in the mobile electronic device 100. For example, when a user pays for a corresponding product using a mobile coupon under the control of the control unit 170, the display panel 153 may output a screen for determining validity, such as whether the effective date of the mobile coupon has expired and whether the mobile coupon has already been used.

Such a display panel 153 may be formed of a Liquid Crystal Display (LCD), an Active Matrix Organic Light Emitting Diode (AMOLED), a Passive Matrix Organic Light Emitting Diode (PMOLED), a flexible display, a transparent display, and the like.

The storage unit 160 is the secondary memory unit of the control unit 170, and may include a disk, RAM, and flash memory. The storage unit 160 may store data that is generated by the mobile electronic device 100 under the control of the control unit 170 or data that is received from an external device, for example, a server or a desktop PC through the communication unit 110 or an external interface unit (not shown). The storage unit 160 may include a mobile coupon table 161, a mobile coupon information extraction program 163, a domain database (DB) 165, and a validity determination program 167.

The mobile coupon table 161 may store information about the items of at least one mobile coupon, such as the discount rate of the mobile coupon and conditions that the mobile coupon is used, in addition to a domain to which the mobile coupon is applicable, mobile coupon code, and the effective date of the mobile coupon that are collected and extracted from the mobile coupon according to each mobile coupon. When the mobile electronic device 100 accesses a web site, the control unit 170 may search the mobile coupon table 161 in order to determine whether information about a domain identical with the domain of the accessed web site is present in the mobile coupon table 161. If, as a result of the validity determination, information about the domain identical with the domain of the accessed web site is found to be present in the mobile coupon table 161, the control unit 170 may control the display unit 150 so that it outputs information about a mobile coupon corresponding to the information about the domain.

The mobile coupon information extraction program 163 is an element configured to extract information about a mobile coupon from a mobile coupon information region that has been selected from a web site, an e-mail, a text message, and the like. To this end, the mobile coupon information extraction program 163 may include an Optical Character Reader (OCR). The control unit 170 may receive input, received in a looped curve form for a mobile coupon displayed on a web site in an image form, from a touch panel 151, and may read the alphabet, numbers, and symbols included in a region within the looped curve using the OCR. Furthermore, in some embodiments of the present disclosure, when a mobile coupon information region is selected by an electronic pen and input of a type that is written along mobile coupon code included in the mobile coupon information region or input of a type in which a line is drawn with respect to a text part in which a mobile coupon is written is received, the control unit 170 may control the mobile coupon information extraction program 163 so that it reads mobile coupon code corresponding to the received input.

Furthermore, the mobile coupon information extraction program 163 may automatically extract information about a domain to which a mobile coupon is applicable from an e-mail image or a text message. For example, in an e-mail image, a domain to which a mobile coupon is applicable may be configured to include one or more of domain symbols, such as "www", "Http", "@", "co", "ac", and "or". Furthermore, the mobile coupon information extraction program 163 may extract a telephone number related to a domain to which a mobile coupon is applicable from a screen on which a received text message is displayed.

In order to estimate a domain to which a mobile coupon is applicable, the domain DB 165 may store domains corresponding to trademark images of a plurality of brands, the abbreviations of the brands, and the telephone numbers of the brands along with the trade mages, abbreviations, and telephone numbers of the brands. For example, when the mobile coupon information extraction program 163 extracts a trademark image, such as a symbol or a figure, other than a text form from an image of a mobile coupon, the control unit 170 may compare the extracted trademark image with a trademark image previously stored in the domain DB 165. If, as a result of the comparison, a trademark image similar to the trademark image previously stored in the domain DB 165 is found to be present, the control unit 170 may estimate that a domain corresponding to the trademark image previously stored in the domain DB 165 is a domain to which the image of the mobile coupon is applicable. For another example, when the mobile coupon information extraction program 163 extracts the telephone number of a brand stored in a text message under the control of the control unit 170, the control unit 170 may determine whether a telephone number that is identical with the extracted telephone number and that has been previously stored in the domain DB 165 is present in the domain DB 165. If, as a result of the validity determination, a telephone number that is identical with the extracted telephone number and that has been previously stored is found to be present in the domain DB 165, the control unit 170 may estimate that a domain stored along with the previously stored telephone number is a domain to which an image of a mobile coupon is applicable. As described above, the control unit 170 may store an estimated domain as information about a domain within information about a mobile coupon in the mobile coupon table 161.

The validity determination program 167 may determine whether a mobile coupon stored in the mobile electronic device 100 is effective. For example, if the expiration date of a mobile coupon stored in the mobile electronic device 100 has expired or the mobile coupon has already been used, the validity determination program 167 may determine that the mobile coupon is not effective. An expiration date and the case where a mobile coupon has already been used have been illustrated as an embodiment of the present disclosure, but the present disclosure is not limited thereto. For example, the present disclosure may include all the cases where a mobile coupon is not effective. Furthermore, in some embodiments of the present disclosure, a separate applet may be installed on an application related to a mobile coupon, and thus the control unit 170 may perform control so that the validity of a mobile coupon is automatically determined.

Furthermore, the storage unit 160 may store applications for other option functions, such as a sound playback function, an image or moving image playback function, and a broadcasting playback function, user data, and data transmitted and received when communication is performed, in addition to an Operating System (OS) for the operation of the mobile electronic device 100.

The control unit 170 may control the overall operation of the mobile electronic device 100 and the flow of signals between the internal elements of the mobile electronic device 100, and may function to process data. Furthermore, the control unit 170 may control the supply of power from a battery to the internal elements. The control unit 170 may perform control so that mobile coupons are collected and output. Operations, such as the collection and output of mobile coupons under the control of the control unit 170, are described below.

Figure 2:
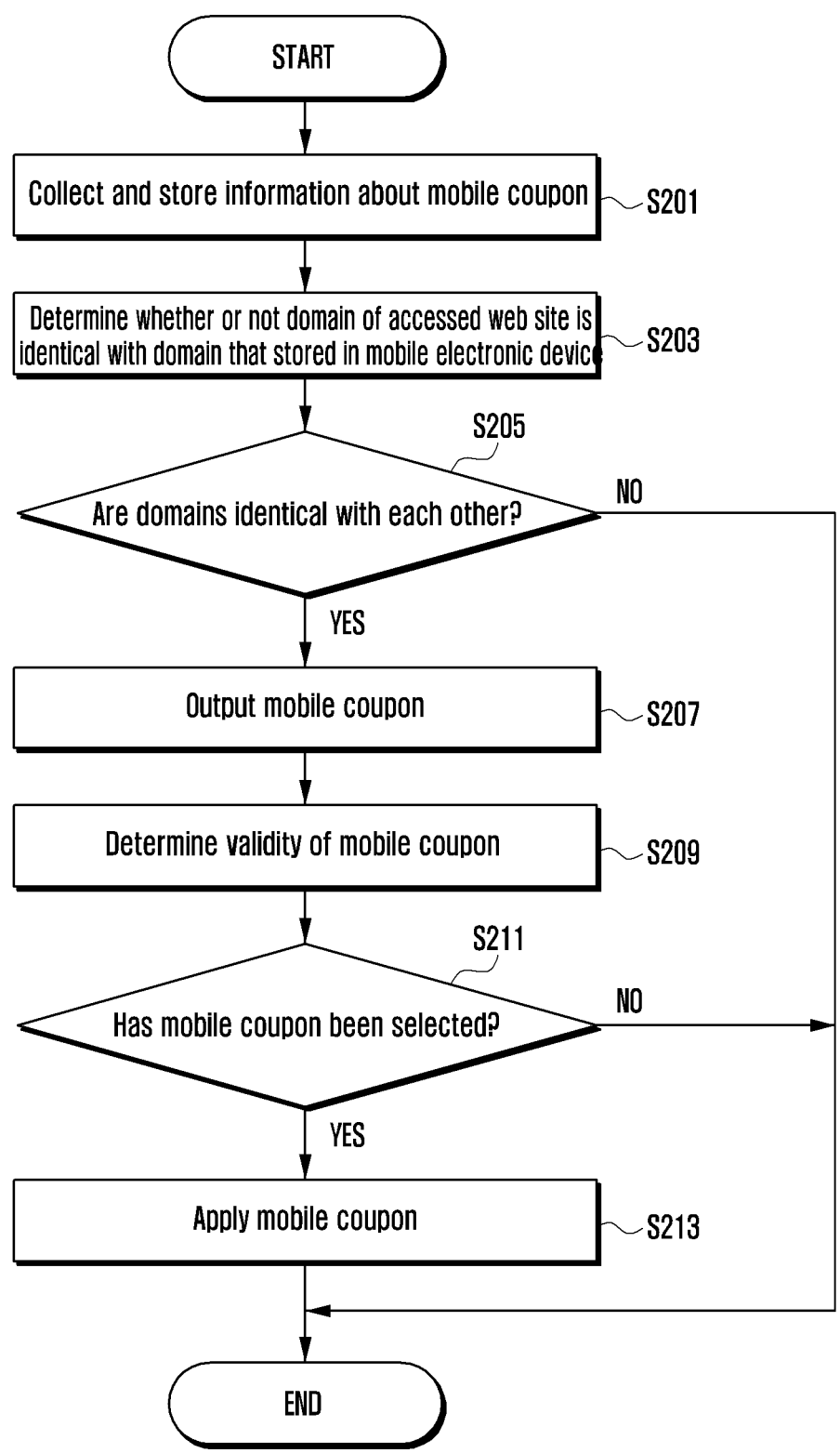
FIG. 2 is a flowchart illustrating a method for providing, by a mobile electronic device, a mobile coupon according to an embodiment of the present disclosure.

FIG. 2 is a flowchart illustrating a method for providing, by a mobile electronic device, a mobile coupon according to an embodiment of the present disclosure.

Referring to FIG. 2, at operation S201, the control unit 170 may collect and store information about a mobile coupon. In this case, the information about the mobile coupon may include a mobile coupon code, a domain to which the mobile coupon is applied, the effective date of the mobile coupon, the discount rate of the mobile coupon, and coupon use conditions. This is only illustrative, and the information about the mobile coupon may include all pieces of information related to the mobile coupon. The information about the mobile coupon may be collected in various ways. For example, in order to extract a mobile coupon information region on a mobile coupon image including a mobile coupon, the control unit 170 may collect information about the mobile coupon through the input of a looped curve using an electronic pen, input written along text in which the mobile coupon is indicated using an electronic pen, or input in which a line is drawn with respect to text using an electronic pen, and may store the collected information in the mobile coupon table 161 of the storage unit 160. Such a method for collecting and storing a mobile coupon is described below with reference to FIGS. 3, 4, 5A, 5B, 5C, 5D, 6A, 6B, 6C, 6D, 7, 8, and 9.

At operation S203, the control unit 170 may determine whether the domain of an accessed web site is identical with a domain that is stored in the mobile electronic device 100 and to which the mobile coupon is applicable. For example, when accessing a web site or paying for a product, the control unit 170 may obtain the domain of the web site by parsing the web site. In order to obtain the domain of a web site, the case where a web site is accessed and the case where a product is paid for have been illustrated as being examples, but the technical spirit of the present disclosure is not limited thereto. For example, the control unit 170 may determine whether the domain of the accessed web site is identical with a domain that is stored in the mobile electronic device 100 and to which the mobile coupon is applicable at a point of time desired by a user while the web site is accessed. Furthermore, the domain may include all domains indicated in all languages including the Korean alphabet in addition to a domain indicated the English language. As described above, the control unit 170 may obtain the domain from the web site, and may determine whether the obtained domain is identical with the domain of a mobile coupon included in the mobile electronic device 100 by comparing the obtained domain with the domain of the mobile coupon.

If, as a result of the determination at operation S205, the domain of the accessed web site is determined to be identical with the domain to which the mobile coupon is applicable, the control unit 170 may output the mobile coupon at operation S207. The control unit 170 may output the mobile coupon in various ways. For example, the control unit 170 may perform control so that the mobile coupon is output through a notification panel. More specifically, the control unit 170 may perform control so that a drag input for an indicator region is received from a user and the notification panel is output. The control unit 170 may perform control so that a description of the mobile coupon within the notification panel, for example, information about a product, discount conditions, and an effective date are output. Furthermore, the control unit 170 may perform control so that a button for selecting the mobile coupon is output to the notification panel. When input to the button is received, the control unit 170 may perform control so that the web page of a product to which the mobile coupon is applied or a web page for the payment of a product to which the mobile coupon is applied is output. In some embodiments of the present disclosure, the control unit 170 may perform control so that a screen on which mobile coupon code has been input to a mobile coupon code input box is output when the web page for the payment of the product has been output. For another example, the control unit 170 may perform control so that input to a menu button is received and a soft button related to the mobile coupon is output. When input to the soft button is received, the control unit 170 may output the mobile coupon in a pop-up window way. For yet another example, if, as a result of the determination at operation S205, the domain of the accessed web site is determined to be identical with the domain to which the mobile coupon is applicable, the control unit 170 may perform control so that the mobile coupon is automatically output in a pop-up window or multi-window way along with a browser window that is now displayed.

At operation S209, the control unit 170 may determine the validity of the mobile coupon. The control unit 170 may obtain information about the effective date of the mobile coupon and whether the mobile coupon has already been used from the web site. If it is determined that the effective date has expired or the mobile coupon has already been used based on the obtained information, the control unit 170 may perform control so that indication indicative of that the corresponding mobile coupon is not effective is output. If it is determined that the effective date has not expired or the mobile coupon has not been used based on the obtained information, the control unit 170 may perform control so that indication indicative that the corresponding mobile coupon is effective is output. Furthermore, in some embodiments of the present disclosure, a separate applet may be installed on an application related to the mobile coupon. In this case, the control unit 170 may perform control so that the validity of the mobile coupon is automatically determined. Determining the validity of the mobile coupon may be omitted depending on an embodiment. For example, when information about the expiration date of a collected mobile coupon is stored as the item of information about the mobile coupon, determining the validity of the mobile coupon may be omitted in an embodiment in which information about a mobile coupon whose expiration date has expired has been set to be automatically deleted. For another example, if a mobile coupon has been used, determining the validity of the mobile coupon may be omitted in an embodiment in which information about the mobile coupon has been set to be deleted from the mobile coupon table 161 stored in the storage unit 160.

When the mobile coupon is output at operation S207 or an effective mobile coupon is output to a screen at operation S209, the control unit 170 may determine whether a selection input for applying the mobile coupon is received at operation S211. If, as a result of the determination at operation S211, the selection input for applying the mobile coupon is determined to be received, the control unit 170 may apply the mobile coupon at operation S213. In this case, the control unit 170 may perform control so that mobile coupon code included in the information about the mobile coupon is output to a mobile coupon code input box for payment. The order that operation S207, operation S211, and operation S213 are executed may be changed. For example, in FIG. 2, selecting and applying the mobile coupon at operation S211 and at operation S213 have been illustrated as being executed after determining the validity of the mobile coupon at operation S209, but in some embodiments of the present disclosure, the validity of the mobile coupon may be determined at operation S209 after selecting and applying the mobile coupon at operation S211 and at operation S213.

Furthermore, if the control unit 170 determines that the domain of the accessed web site is not identical with a domain that is stored in the mobile electronic device 100 and to which the mobile coupon is applicable at operation S205 or that an selection input for applying the mobile coupon has not been received at operation S211, providing the mobile coupon may be terminated.

Figure 3:
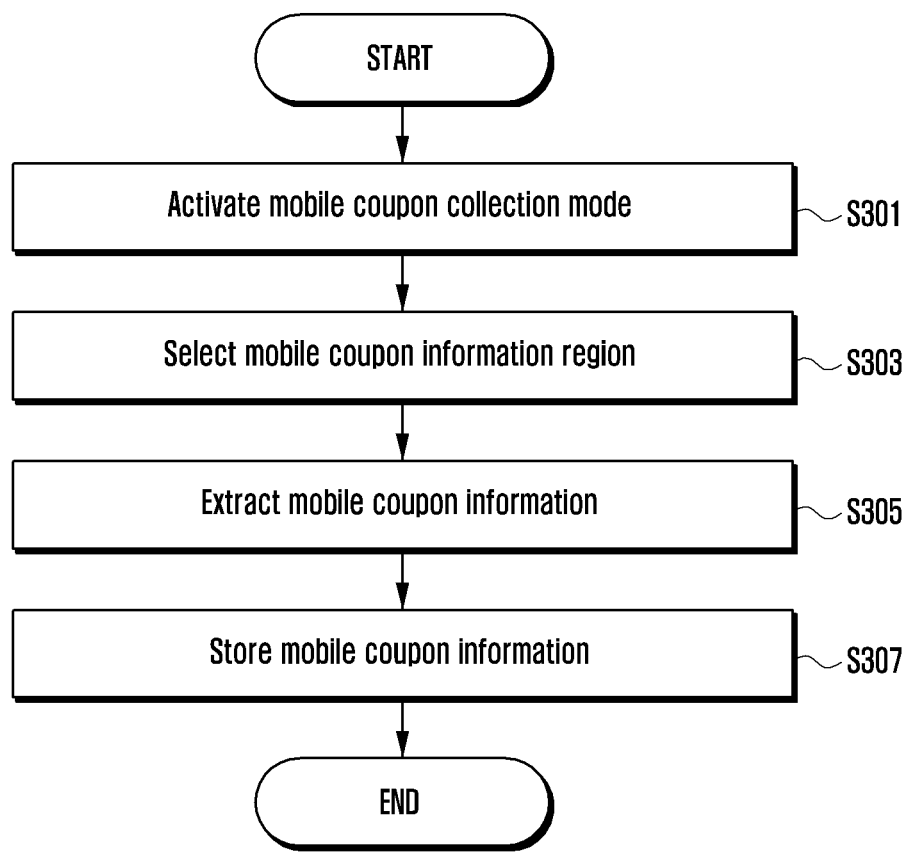
FIG. 3 is a flowchart illustrating a method for collecting and storing, by a mobile electronic device, a mobile coupon according to an embodiment of the present disclosure.

FIG. 3 is a flowchart illustrating a method for collecting and storing, by a mobile electronic device, a mobile coupon according to an embodiment of the present disclosure.

Referring to FIG. 3, at operation S301, the control unit 170 may activate mobile coupon collection mode in a web site, an e-mail, a text message output screen, and the like. The technical spirit of the present disclosure is not limited to the web site, the e-mail, or the text message, and may include all applications capable of outputting images from which mobile coupons may be collected. For example, in some embodiments of the present disclosure, mobile coupon collection mode may be activated even in a screen to which an image captured by the camera 140 of the mobile electronic device 100 has been output, and information about a mobile coupon may be collected from the screen.

At operation S303, the control unit 170 may select a mobile coupon information region. In this case, the mobile coupon information region may be a region that includes an image and text in which information about a mobile coupon is displayed. For example, the mobile coupon information region may be a region in which a domain to which a mobile coupon is applicable, mobile coupon code, and the effective date of the mobile coupon are displayed as information about the mobile coupon. In some embodiments of the present disclosure, the mobile coupon information region may include an image, the telephone number, and the like, of a brand corresponding to a mobile coupon. The control unit 170 may select the mobile coupon information region in response to input, for example, a looped curve input using an electronic pen, input that is written along text in which a mobile coupon is indicated using an electronic pen, or input in which a line is drawn with respect to text using an electronic pen. Furthermore, the control unit 170 may select a region including indication, such as a domain to which a mobile coupon is applicable, mobile coupon code, and the effective date of the mobile coupon, depending on the setting of input using an electronic pen, for example, color or attributes (e.g., a pencil and fluorescent color).

At operation S305, the control unit 170 may extract information about the mobile coupon. The control unit 170 may read the alphabet, numbers, or symbols included in the selected mobile coupon information region using the mobile coupon information extraction program 163 (e.g., an OCR), and may extract information about the mobile coupon that corresponds to the alphabet, numbers, or symbols. For example, as in the case where www.xxx.com is extracted from a mobile coupon information region, the control unit 170 may directly extract a domain to which the mobile coupon is applicable. Furthermore, the control unit 170 may control the mobile coupon information extraction program 163 so that it automatically extracts information about a domain to which the mobile coupon is applicable from an e-mail image or a text message. For example, the control unit 170 may control the mobile coupon information extraction program 163 so that it extracts text between domain symbols, such as "www", "Http", "@", "co", "ac", or "or", or text including at least one of the domain symbols as a domain to which the mobile coupon is applicable if the domain symbols are read from an e-mail image.

In contrast, the control unit 170 may not directly extract a domain to which the mobile coupon is applicable through the extracted alphabet and symbols. For example, if the control unit 170 extracts a trademark image of a corresponding brand from a mobile coupon information region, it may not directly extract a domain to which a mobile coupon is applicable. In such a case, in an embodiment of the present disclosure, the control unit 170 may estimate a domain to which the mobile coupon is applicable based on information about the extracted mobile coupon. For example, the control unit 170 may control the mobile coupon information extraction program 163 so that it extracts a trademark image, such as a symbol or a figure, other than a text form from an image of a mobile coupon or so that it extracts a telephone number related to a domain to which the mobile coupon is applicable from a screen on which a text message is displayed. The control unit 170 may compare the extracted trademark image or telephone number with a trademark image or telephone number previously stored in the domain DB 165. In this case, in order to estimate a domain to which the mobile coupon is applicable, the domain DB 165 is an element capable of previously storing domains corresponding to trademark images of a plurality of brands, the abbreviations of the brands, and the telephone numbers of the brands along with trademark images of the brands, the abbreviations of the brands, and the telephone numbers of the brands. If it is determined that a similar trademark image is present or the same telephone number is present as a result of a comparison between the extracted trademark image or telephone number with a trademark image or telephone number previously stored in the domain DB 165, the control unit 170 may estimate a domain, corresponding to the previously stored trademark image or telephone number, to be a domain to which the mobile coupon is applicable.

In an embodiment of the present disclosure, if two or more of the aforementioned various embodiments are applied at the same time, the control unit 170 may set priorities and extract information about a mobile coupon. For example, if both a trademark image and a telephone number are extracted from a selected mobile coupon information region, the control unit 170 may place a higher priority on a comparison between trademark images than a comparison between telephone numbers when performing the comparison using the domain DB 165.

At operation S307, the control unit 170 may store information about the extracted mobile coupon. For example, the information about the extracted mobile coupon may be stored according to each corresponding item within at least one piece of mobile coupon information that is included in the mobile coupon table 161.

Figure 4:
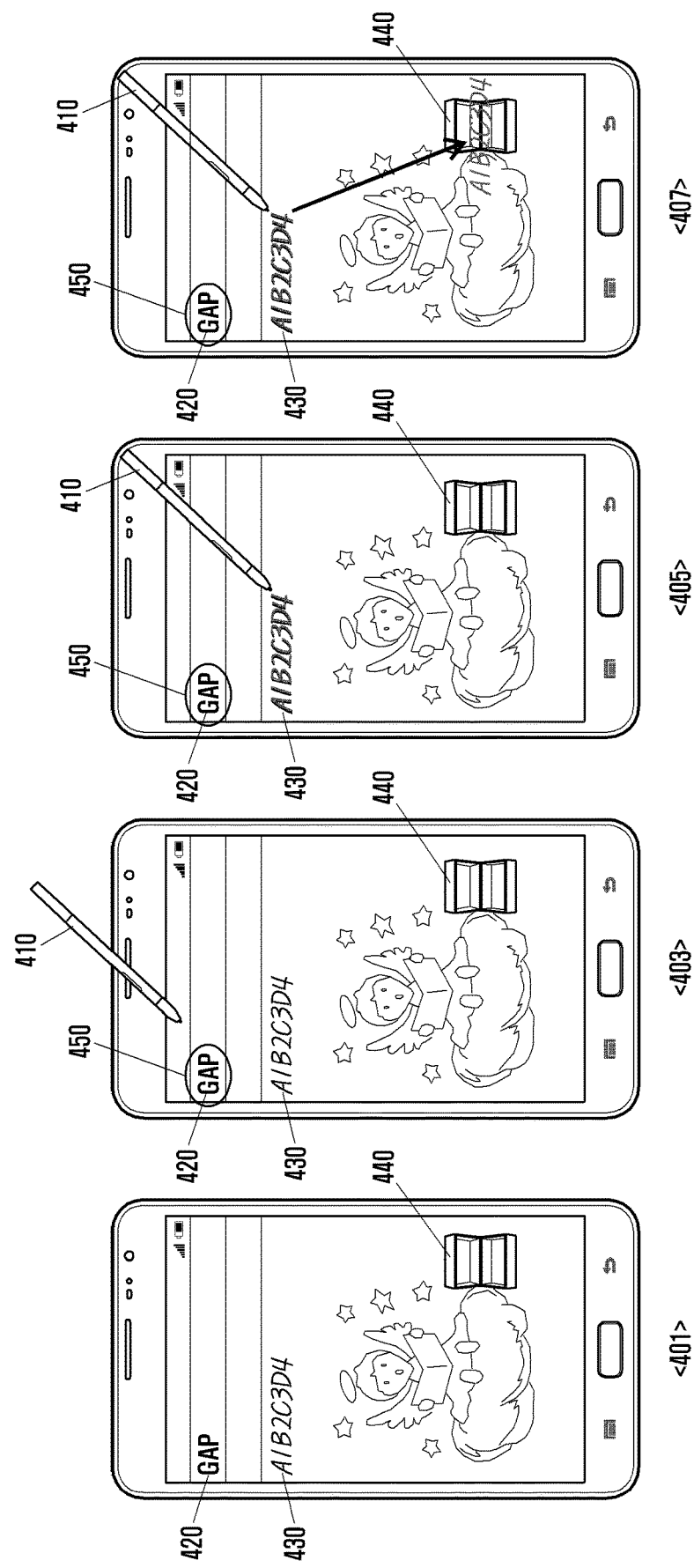
FIG. 4 is a diagram illustrating a method for collecting, by a mobile electronic device, a mobile coupon according to an embodiment of the present disclosure.

FIG. 4 is a diagram illustrating a method for collecting, by a mobile electronic device, a mobile coupon according to an embodiment of the present disclosure.

Referring to FIG. 4, a screen 401 to which an image of a mobile coupon is output is illustrated. A domain 420 to which a mobile coupon is applicable, mobile coupon code 430, and a mobile coupon storage image 440 may be output to the screen 401. A screen 403 for selecting a mobile coupon information region in which the domain 420 to which the mobile coupon is applicable is extracted is illustrated. When input of a looped curve form 450 for the mobile coupon information region is received through an electronic pen 410, the control unit 170 may control the mobile coupon information extraction program 163, for example, an OCR so that it extracts the domain 420 to which a mobile coupon is applicable. Screens 405 and 407 are for extracting the mobile coupon code 430. In screens 405 and 407, when input written along the alphabetic letters and numbers of the output mobile coupon code 430 using an electronic pen is received and consecutively a drag input to the mobile coupon storage image 440 is received, the control unit 170 may select the mobile coupon information region. The control unit 170 may control the mobile coupon extraction program 163 so that the mobile coupon code 430 is extracted in response to the received input. In this case, input using the electronic pen 410, such as input written along the looped curve 450 or the mobile coupon code, may be set by a user or may be set by a designer's intention.

FIGS. 5A, 5B, 5C, and 5D are diagrams illustrating a method for collecting, by a mobile electronic device, a mobile coupon according to an embodiment of the present disclosure.

Figure 5A:
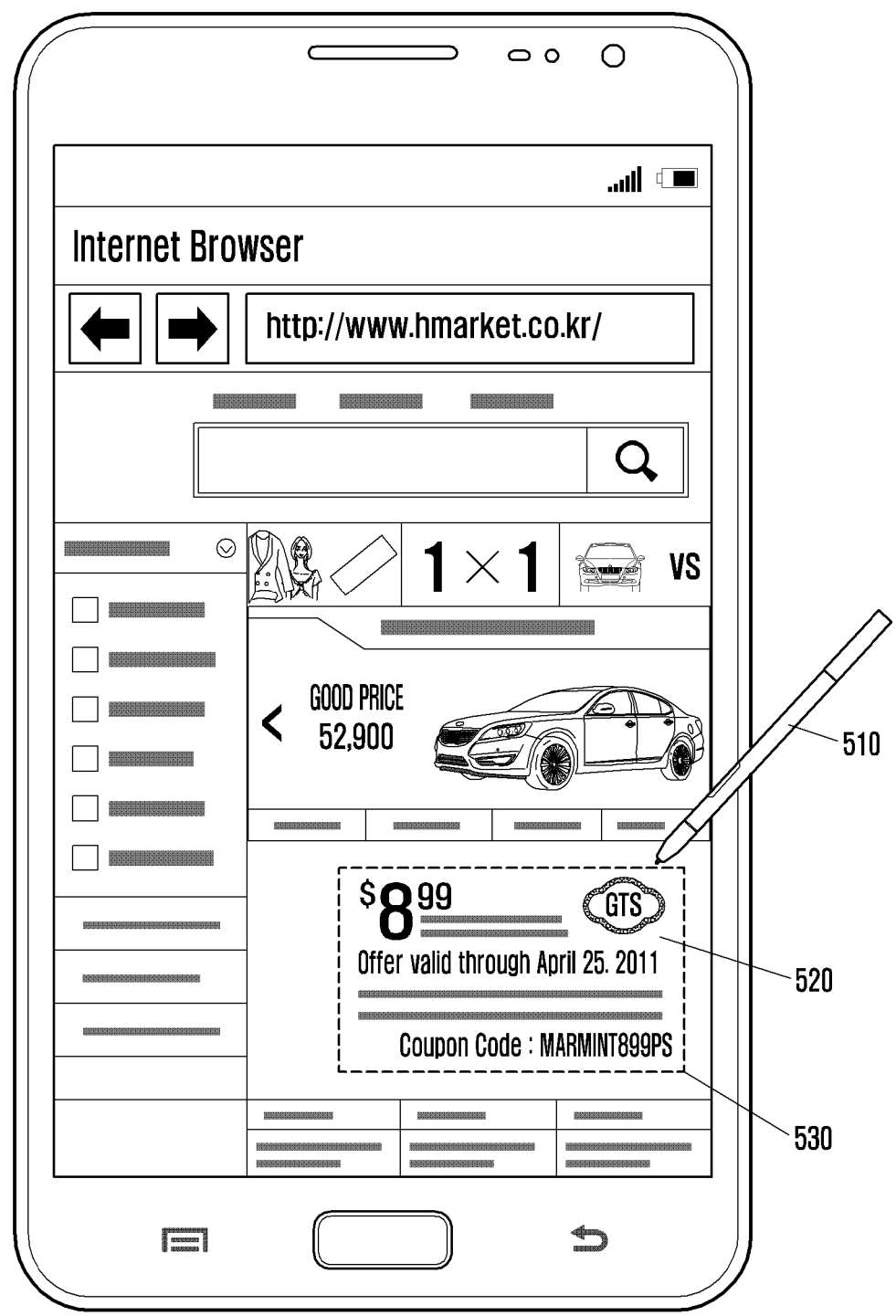
FIGS. 5A, 5B, 5C, and 5D are diagrams illustrating a method for collecting, by a mobile electronic device, a mobile coupon according to an embodiment of the present disclosure.
Figure 5B:
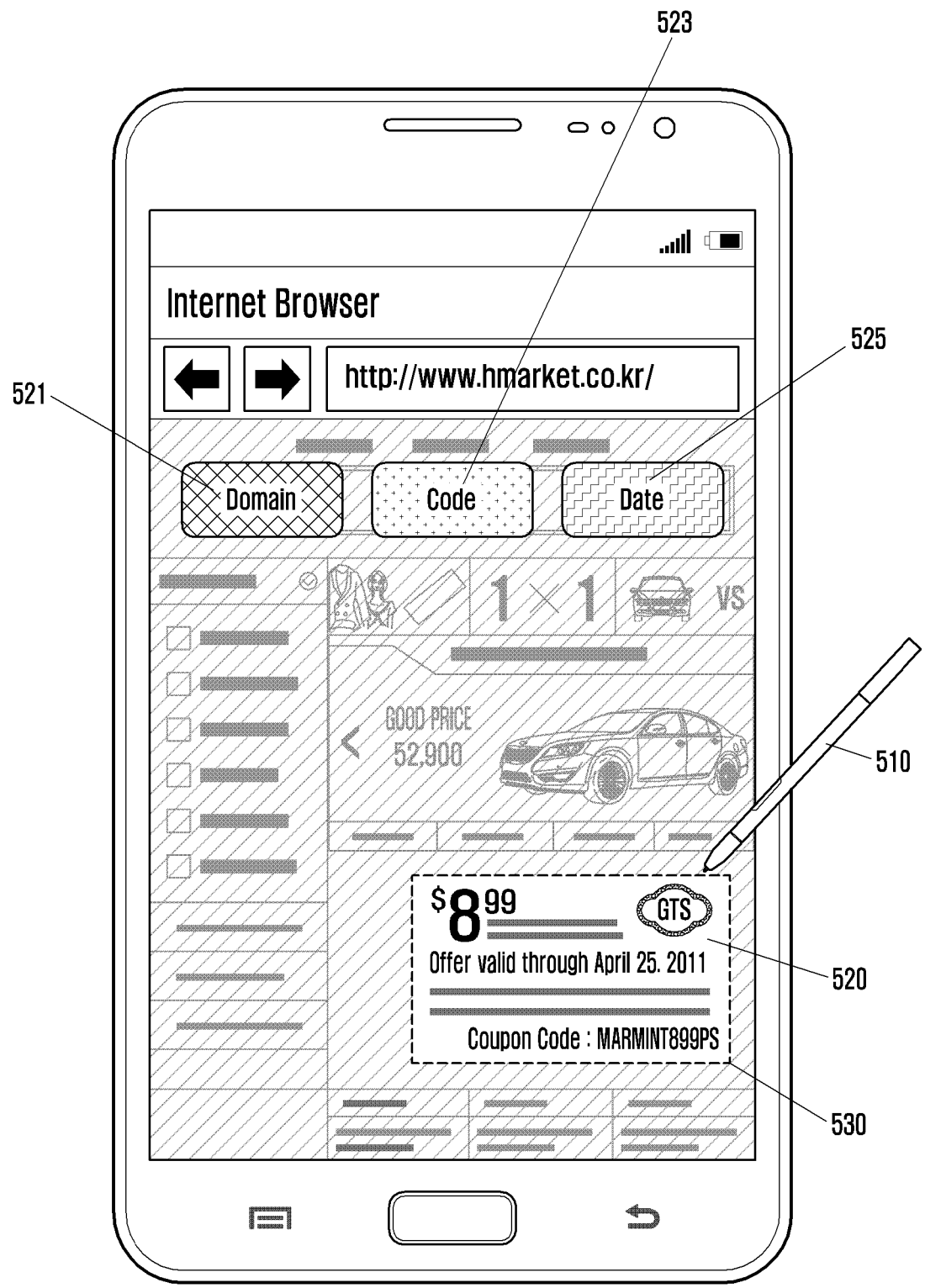

Referring to FIG. 5A, a screen on which a region to which information about a mobile coupon has been output is obtained from an accessed web site is illustrated. In FIG. 5A, the control unit 170 may receive input of a looped curve form 530 using an electronic pen 510, and may obtain a region 520 to which information about a mobile coupon has been output. FIG. 5B illustrates a screen that is output when the region 520 to which information about the mobile coupon has been output is obtained in FIG. 5A.

Referring to FIG. 5B, the control unit 170 may perform control so that the domain selection button 521, the mobile coupon code selection button 523, and the effective date selection button 525 of the mobile coupon are output on one side of the screen, for example, on the upper side of the screen. In one embodiment of the present disclosure, the domain selection button 521, the mobile coupon code selection button 523, and the effective date selection button 525 of the mobile coupon may be output in different colors. For example, the domain selection button 521 may be output in violet, the mobile coupon code selection button 523 may be output in red, and the effective date selection button 525 may be output in blue. Furthermore, the control unit 170 may perform control so that a region other than the region 520 to which information about the mobile coupon has been output is shaded so that it is different from the region 520 to which information about the mobile coupon has been output.

Figure 5C:
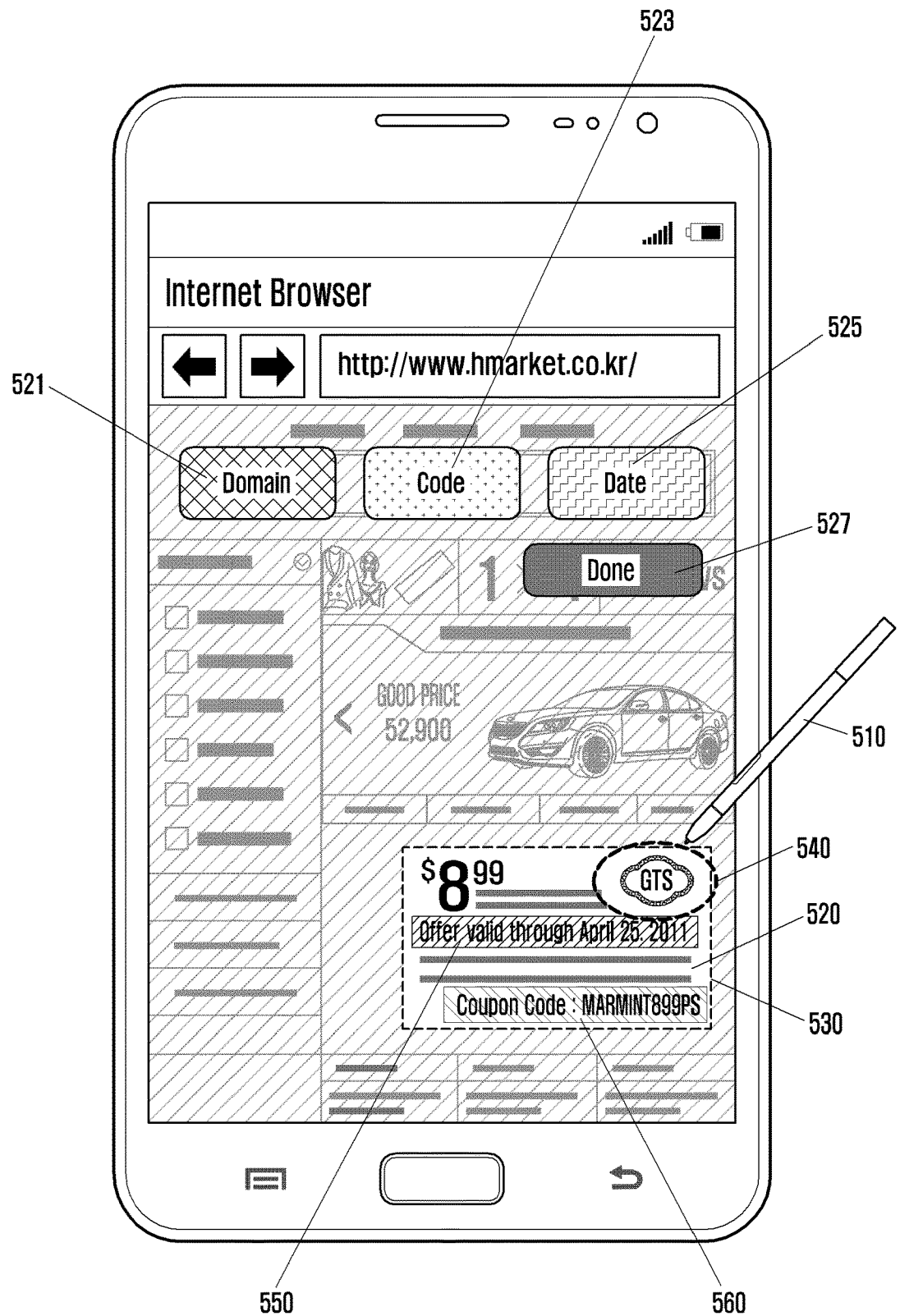

Referring to FIG. 5C, a screen for selecting the mobile coupon information region from the region 520 to which information about the mobile coupon has been output using the domain selection button 521, the mobile coupon code selection button 523, and the effective date selection button 525 of the mobile coupon is illustrated. In FIG. 5C, when input to the domain selection button 521 using a finger or the electronic pen 510 is received and input of a looped curve form for a part 540 including a trademark image of the mobile coupon within the region 520 to which information about the mobile coupon has been output is received, the control unit 170 may select the information region of a domain. Furthermore, when input to the mobile coupon code selection button 523 using a finger or the electronic pen 510 is received and input of a type in which a line is drawn with respect to a part 560 that includes information about mobile coupon code within the region 520 to which information about the mobile coupon has been output is received, the control unit 170 may select the mobile coupon code information region. Furthermore, when input to the effective date selection button 521 using a finger or the electronic pen 510 is received and input of a type in which a line is drawn with respect to a part 550 including information about the effective date of the mobile coupon within the region 520 to which information about the mobile coupon has been output is received, the control unit 170 may select the information region of the effective date of the mobile coupon. In some embodiments of the present disclosure, when the inputs of the electronic pen 510 having colors corresponding to the domain selection button 521, the mobile coupon code selection button 523, and the effective date selection button 525 of the mobile coupon that have been output in different colors are received, the control unit 170 may select a region that includes information about a mobile coupon corresponding to each button. For example, when a touch input to a domain selection button that is output in violet is received and then input of a looped curve form using the electronic pen 510 that has been set to be output in violet is received, the control unit 170 may select a region that includes information about a mobile coupon corresponding to the domain selection button, that is, information about a domain. In FIG. 5C, when a region including information about the mobile coupon is selected, the control unit 170 may receive input to the selection completion button 527.

Figure 5D:
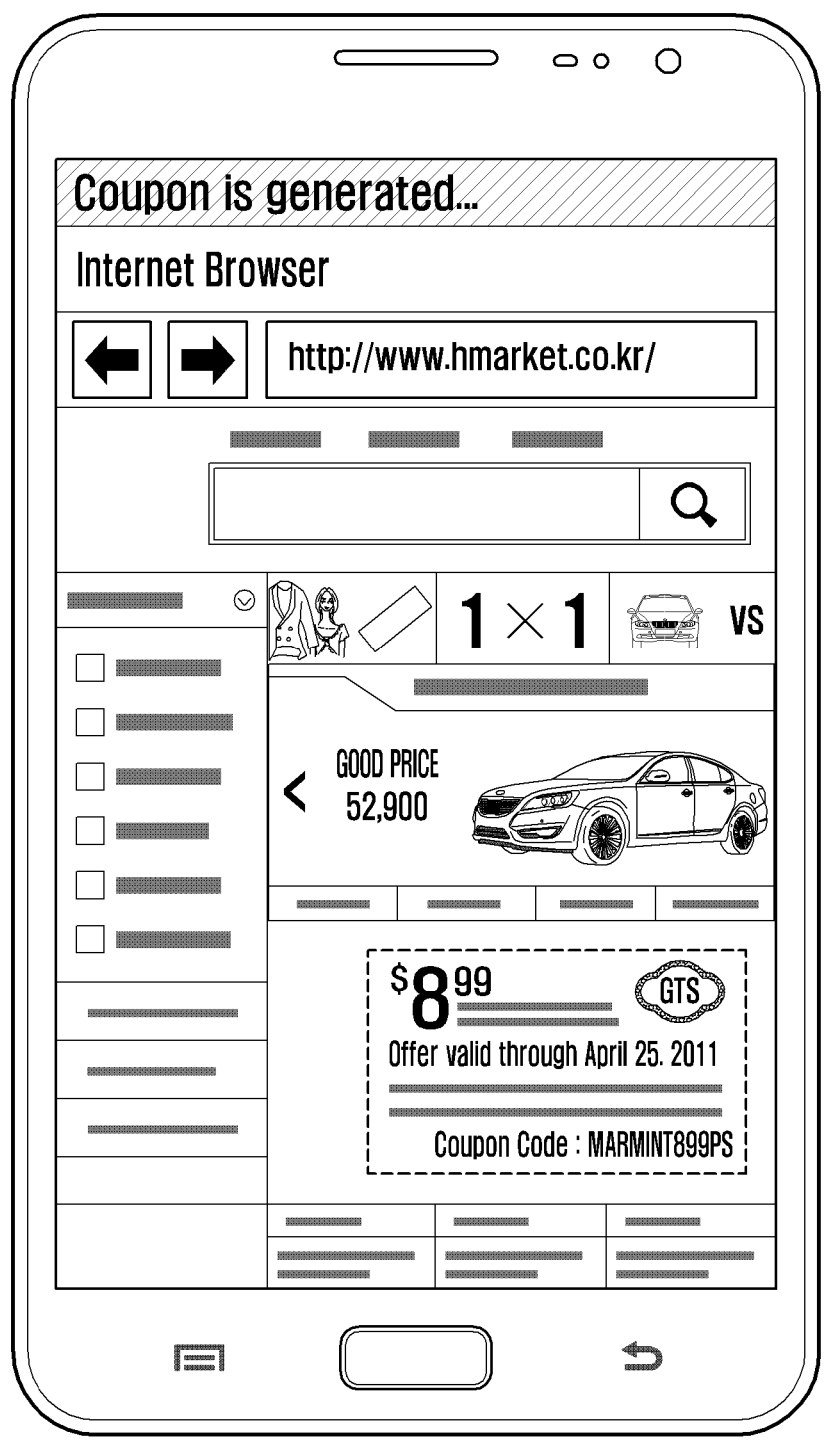

Referring to FIG. 5D, a screen that is output when a region in which the information region of the mobile coupon is selected is illustrated. In FIG. 5D, the control unit 170 may output information indicative that the mobile coupon has been generated, such as "Coupon is generated . . . ", to an indicator region.

FIGS. 6A, 6B, 6C, and 6D are diagrams illustrating a method for collecting, by a mobile electronic device, a mobile coupon according to an embodiment of the present disclosure.

Figure 6A:
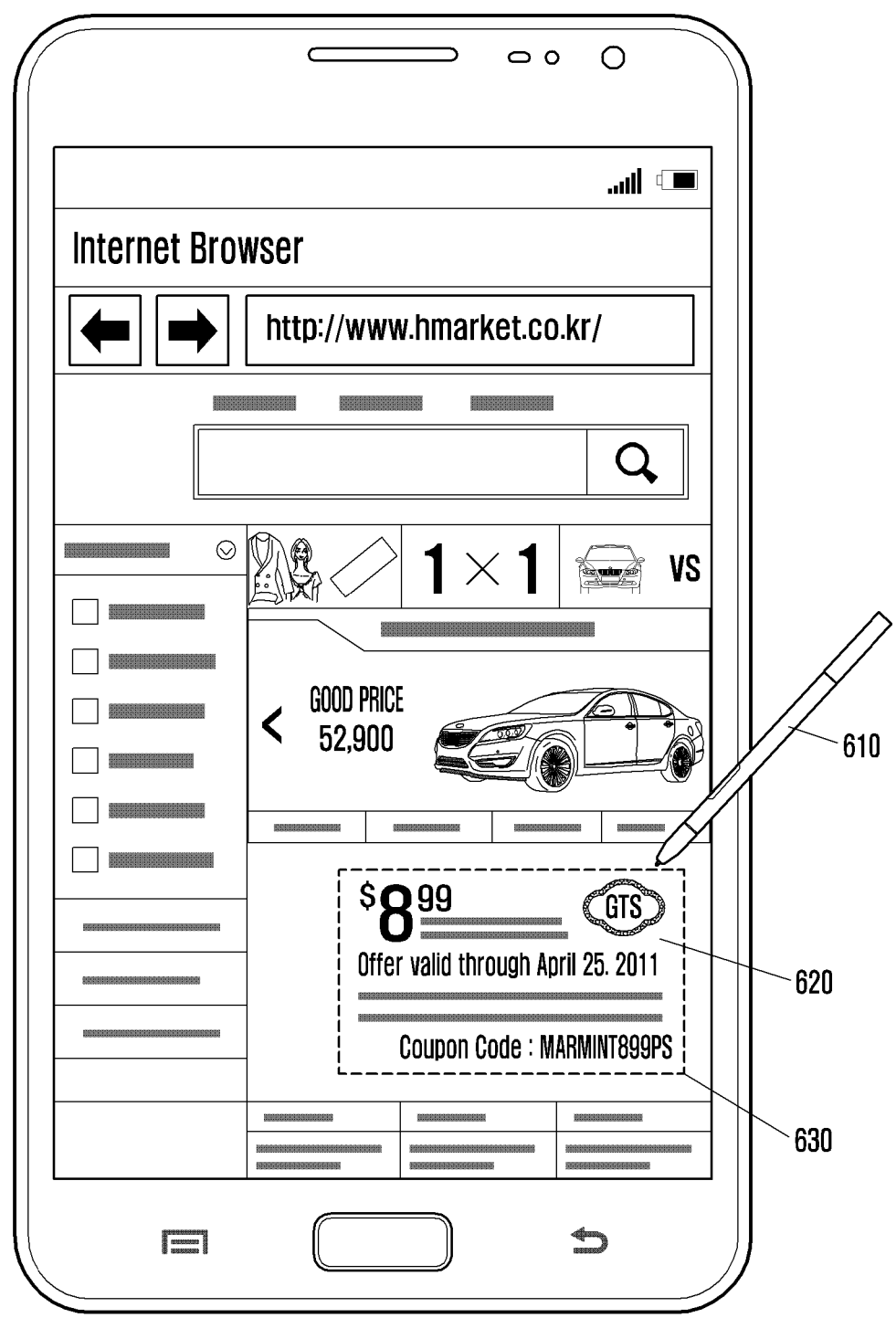
FIGS. 6A, 6B, 6C, and 6D are diagrams illustrating a method for collecting, by a mobile electronic device, a mobile coupon according to an embodiment of the present disclosure.

Referring to FIG. 6A, a screen for obtaining a region to which information about a mobile coupon has been output from an accessed web site is illustrated. In FIG. 6A, the control unit 170 may receive input of a looped curve form 630 using an electronic pen 610, and may obtain a region 620 to which information about a mobile coupon has been output.

Figure 6B:
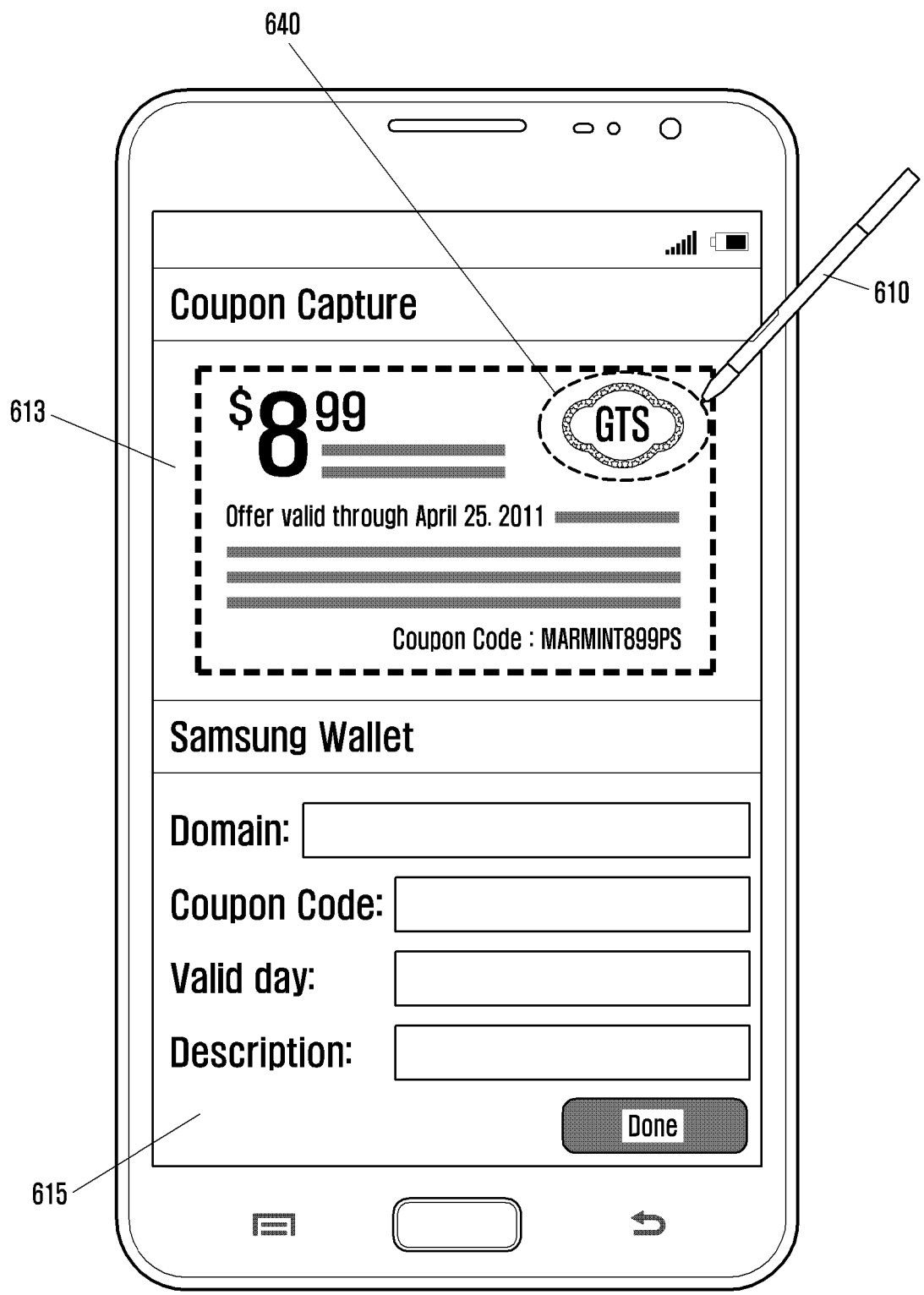

Referring to FIG. 6B, a screen output in a multi-window way is illustrated. A window 613 on the upper side of the screen outputs the obtained region 620 to which information about the mobile coupon has been output, and a window 615 on the lower side of the screen outputs a screen for inputting information about an extracted mobile coupon. More specifically, the window 615 on the lower side of the screen outputs input boxes corresponding to a domain, mobile coupon code, an effective date, and a description as the information items of the mobile coupon. Furthermore, FIG. 6B illustrates a screen for selecting a region 640, including a trademark image, in response to input of a looped curve form using the electronic pen 610 in the window 613 on the upper side of the screen in order to select a region including information about the domain of the mobile coupon. When input for selecting the region 640 including the trademark image in response to input of a looped curve form using the electronic pen 610 is received, the control unit 170 may control the mobile coupon information extraction program 163 so that it extracts the trademark image from the selected region, may compare the extracted trademark image with a trademark image previously stored in the domain DB 165, and may estimate a domain to which the mobile coupon is applicable based on a result of the comparison.

Figure 6C:
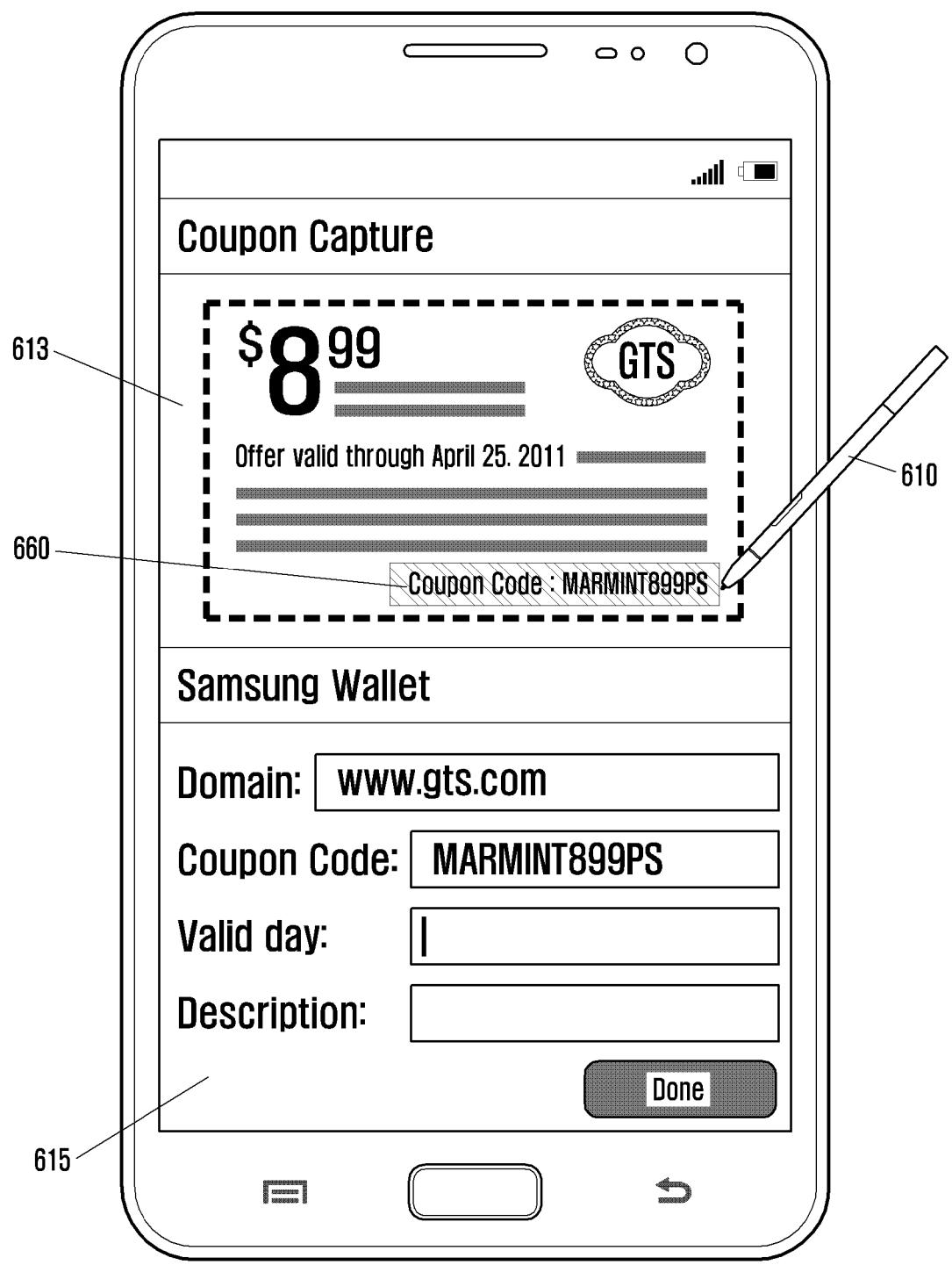
Figure 6D:
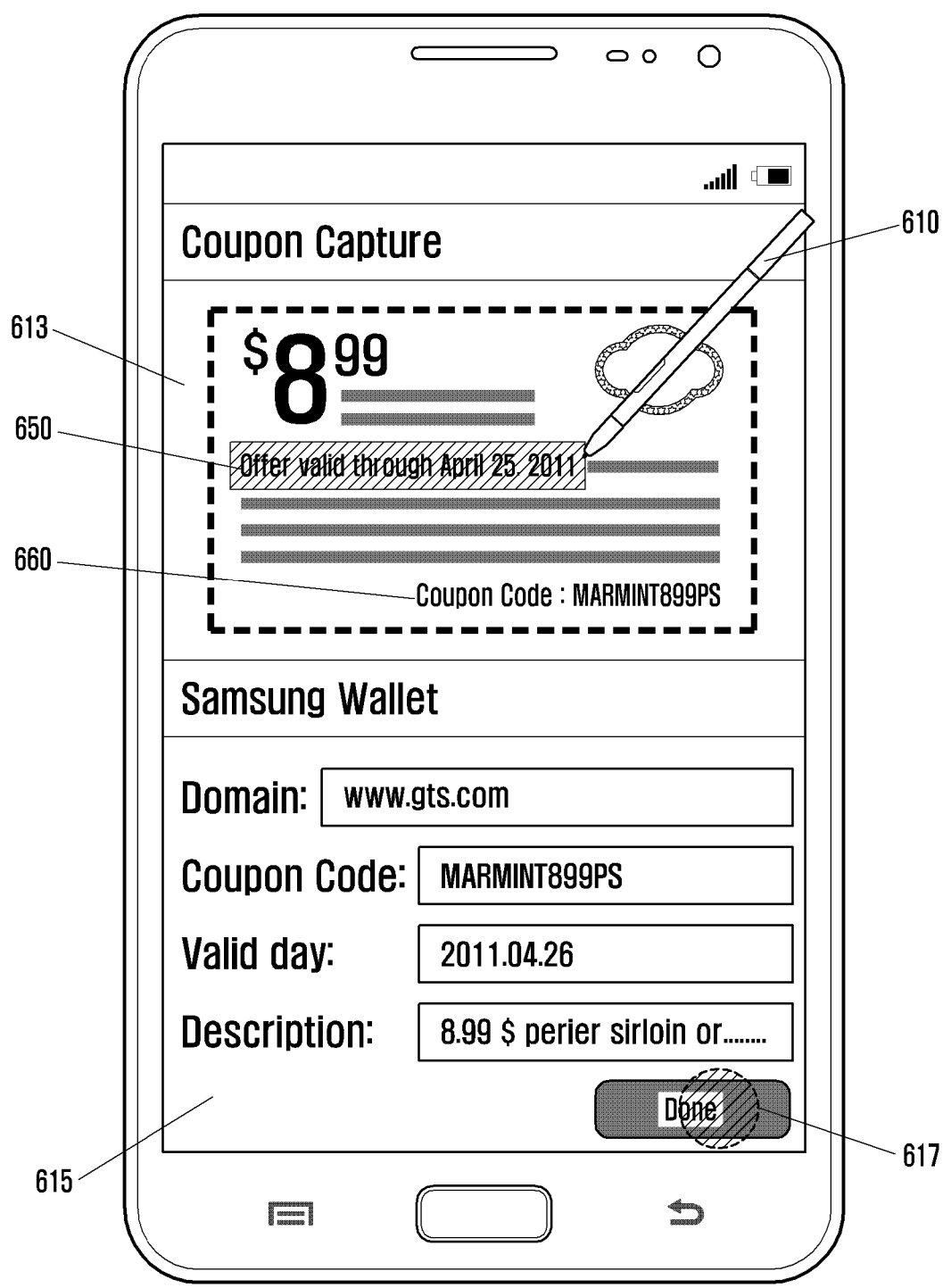

Referring to FIGS. 6C and 6D, screens for inputting mobile coupon code and an effective date are illustrated. FIG. 6C illustrates that www.gts.com, that is, a domain estimated to be a domain to which the mobile coupon is applicable in FIG. 6B, has been input to the domain input box of the window 615 on the lower side of the screen. FIGS. 6C and 6D illustrate screens in which the control unit 170 receives inputs to the input box of a mobile coupon code item, the input box of an effective date item, and the input box of a description and when inputs to a region 660 including mobile coupon code, a region 650 including an effective date, and a region including a description using the electronic pen 610 are received, pieces of information about the mobile coupon code, the effective date, and the description are input to the respective input boxes of the window 615 on the lower side of the screen. In FIG. 6D, when the inputs of the information about the domain, the mobile coupon code, the effective date, and the description of the mobile coupon are completed, the control unit 170 may receive input to a button 617 for storing the mobile coupon, and may store information about the mobile coupon.

Figure 7:
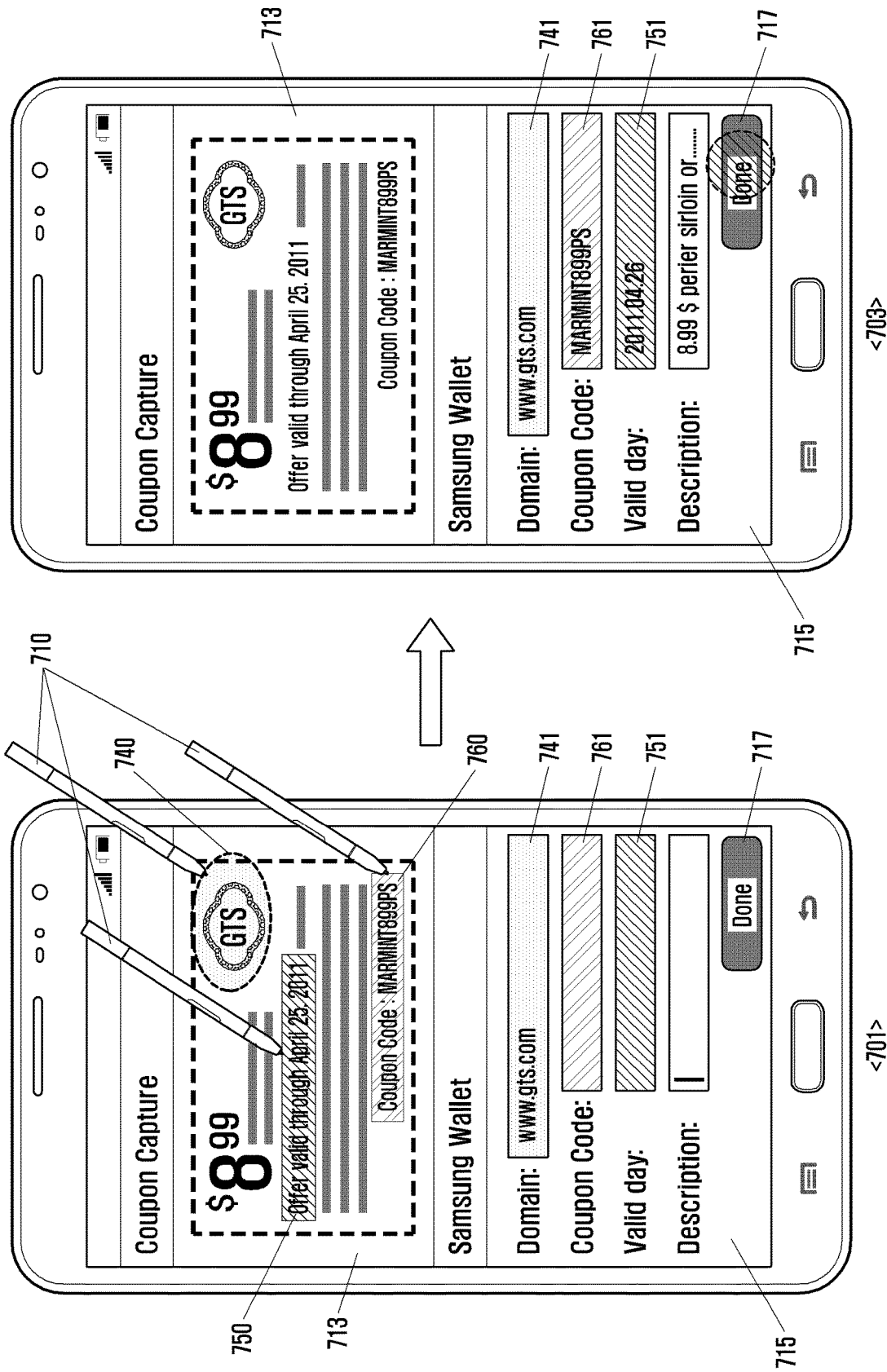
FIG. 7 is a diagram illustrating a method for collecting, by a mobile electronic device, a mobile coupon according to an embodiment of the present disclosure.

FIG. 7 is a diagram illustrating a method for collecting, by a mobile electronic device, a mobile coupon according to an embodiment of the present disclosure.

Referring to FIG. 7, a region that includes information about a mobile coupon obtained from a web site is output to a window 713 on the upper side of a screen in a multi-window way, and input boxes corresponding to respective mobile coupon items are output to a window 715 on the lower side of the screen. In screen 701, when inputs to a region 760 including mobile coupon code, a region 750 including an effective date, and a region including a description using an electronic pen 710 are received, pieces of information about the mobile coupon code, the effective date, and the description are input to the respective input boxes of the window 715 on the lower side of the screen, as illustrated in screen 703. In screen 701, when inputs of different colors to the region including the mobile coupon items are received through the electronic pen 710, the control unit 170 may input information about the mobile coupon items corresponding to mobile coupon item input boxes corresponding to the received inputs. For example, in screen 701, a mobile coupon domain input box 741 may be output in violet, a mobile coupon code input box 761 may be output in red, and a mobile coupon effective date input box 751 may be output in blue. When input of a looped curve form in violet is received with respect to a region 740 including a trademark image according to the setting of input using the electronic pen 710, the control unit 170 may perform control so that the domain of a mobile coupon is output to the mobile coupon domain input box 741. Furthermore, when inputs of a type in which lines in red and blue are drawn with respect to a region including mobile coupon code and a region including an effective date, respectively, are received, the control unit 170 may perform control so that the mobile coupon code and the effective date are output to the mobile coupon code input box 761 and the mobile coupon effective date input box 751, respectively. When the items of the mobile coupon are output to the respective input boxes, the control unit 170 may receive input to a button 717 for storing the mobile coupon, and may store information about the mobile coupon.

Figure 8:
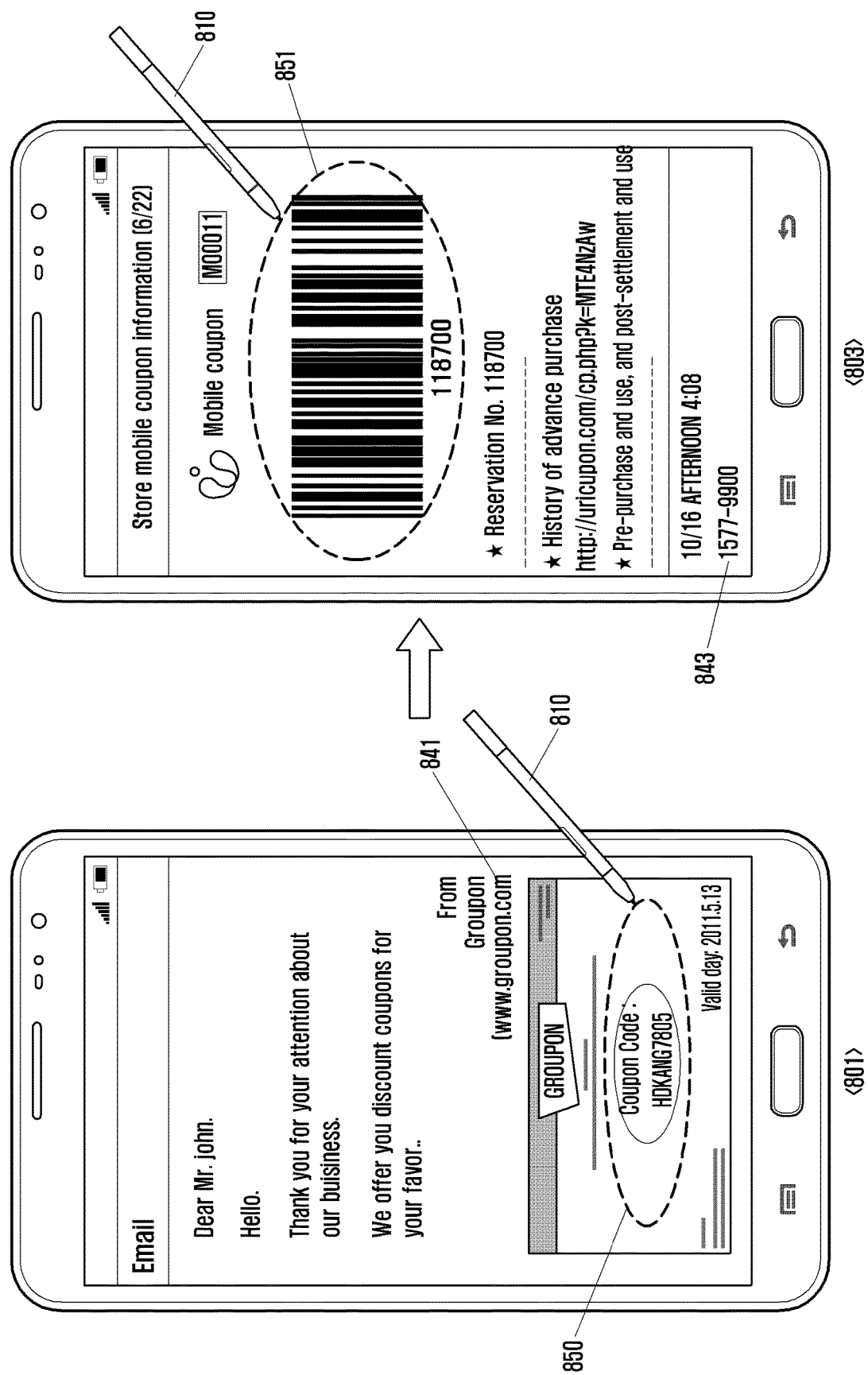
FIG. 8 is a diagram illustrating a method for collecting, by a mobile electronic device, a mobile coupon according to an embodiment of the present disclosure.

FIG. 8 is a diagram illustrating a method for collecting, by a mobile electronic device, a mobile coupon according to an embodiment of the present disclosure.

Referring to FIG. 8, a screen 801 for collecting information about a mobile coupon from a received e-mail, and a screen 803 for collecting information about a mobile coupon from a received text message are illustrated. First, in screen 801, when input of a looped curve form for a region 850 including information about mobile coupon code is received through an electronic pen 810, the control unit 170 may extract the mobile coupon code in response to the received input. Furthermore, the control unit 170 may extract the domain, effective date, and the like, of the mobile coupon based on the contents of the text message. For example, as in screen 801, the control unit 170 may extract the domain 841 of a mobile coupon, including alphabetic letters and symbols indicative of the domain 841, such as "www" and "com", from the alphabetic letters and symbols. Furthermore, the control unit 170 may extract that numbers subsequent to such alphabetic letters are the effective date of the mobile coupon through the alphabetic letters indicative of an effective date, such as "valid day". Such an example is only illustrative, and the technical spirit of the present disclosure is not limited thereto. Accordingly, the technical spirit of the present disclosure may include all methods for extracting the domain of a mobile coupon or the effective date of a mobile coupon through text that is included in e-mail, and the like, and that is output. In screen 803, when input of a looped curve form for a region 851 that includes information about mobile coupon code having a barcode form is received for through the electronic pen 810, the control unit 170 may extract the mobile coupon code based on the received input. In screen 803, information has been illustrated in the mobile coupon code having a barcode form, but the technical spirit of the present disclosure is not limited thereto. For example, the technical spirit of the present disclosure may include a 2-dimensional Quick Response (QR) code form. In screen 803, the control unit 170 may extract the telephone number 943 of a sender based on the contents of a received text message. The control unit 170 may compare the extracted telephone number 843 with a telephone number previously stored in the domain DB 165. If, as a result of the comparison, the extracted telephone number 943 is found to be identical with the telephone number previously stored in the domain DB 165, the control unit 170 may estimate that a domain stored along with the previously stored telephone number is a domain to which an image of a mobile coupon is applicable.

FIG. 9 is a diagram illustrating a method for collecting, by a mobile electronic device, a mobile coupon according to an embodiment of the present disclosure.

Referring to FIG. 9, in screen 901 of the mobile electronic device, a camera 140 may photograph a mobile coupon 910 that is issued in a printed form, such as paper, offline under the control of the control unit 170. Thereafter, a method for converting the photographed mobile coupon into an image form and extracting information about a mobile coupon from the mobile coupon converted into the image form under the control of the control unit 170 may be any one of the aforementioned methods. In screen 903 of the mobile electronic device, a screen 903 on which an image of the photographed mobile coupon is displayed and mobile coupon items, for example, the domain 940, mobile coupon code 960, and effective date 950 of the mobile coupon are selected on the image of the mobile coupon is output to the display unit 150 of the mobile electronic device 100.

Figure 10:
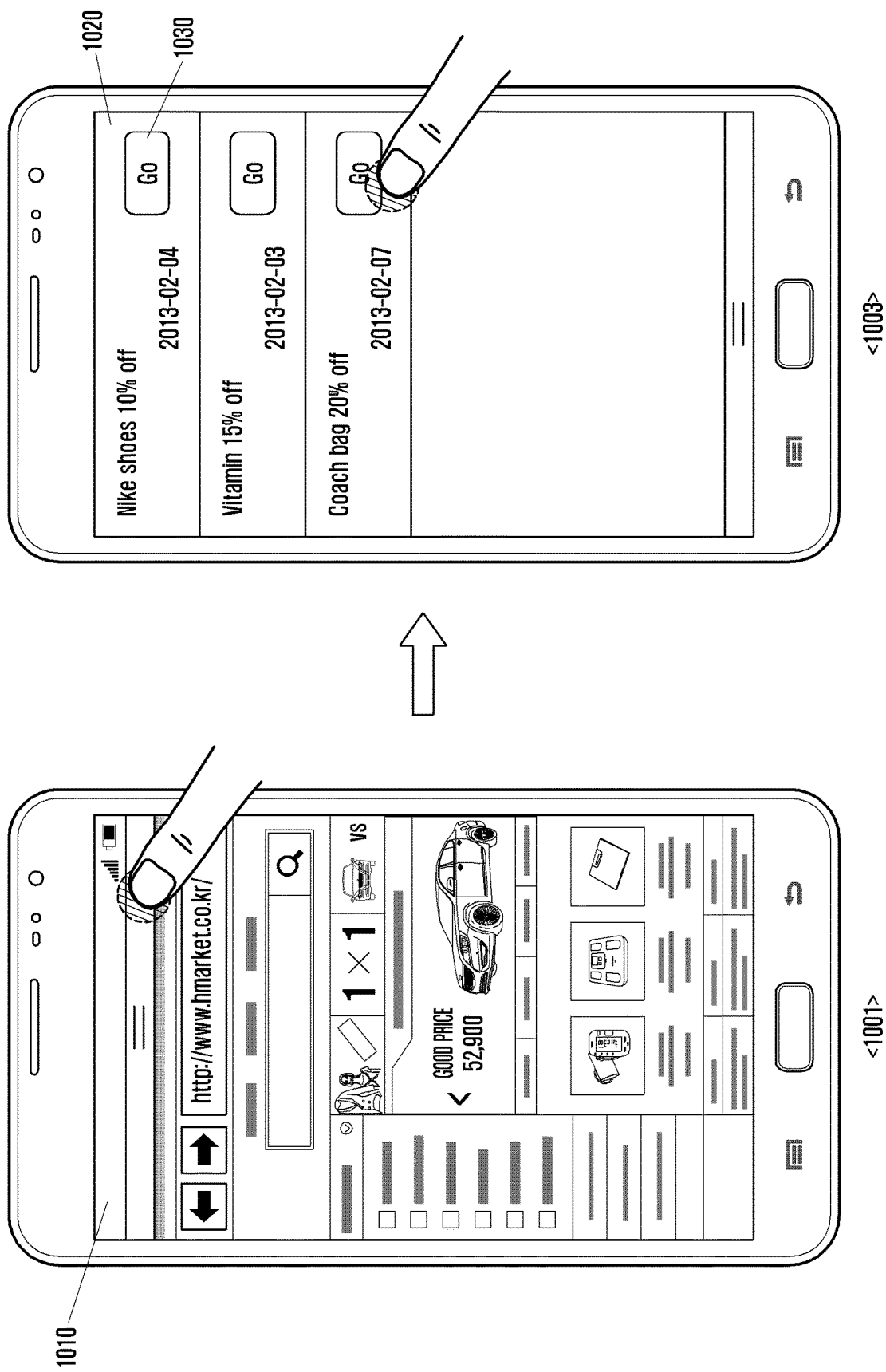
FIG. 10 is a diagram illustrating a method for outputting, by a mobile electronic device, a mobile coupon according to an embodiment of the present disclosure.

FIG. 10 is a diagram illustrating a method for outputting, by a mobile electronic device, a mobile coupon according to an embodiment of the present disclosure.

Referring to FIG. 10, in the case where the control unit 170 determines that the domain of an accessed web site is identical with a domain to which a mobile coupon is applicable, when a drag input to the indicator region 1010 of the mobile electronic device 100 is received in screen 1001, the control unit 170 may perform control so that a notification panel 1020 is output in screen 1003. Furthermore, the control unit 170 may perform control so that a description of the mobile coupon, for example, information about a product, the discount conditions of the product, and the effective date of the product are output within the notification panel 1020. Furthermore, the control unit 170 may perform control so that a button 1030 for selecting the mobile coupon is output to the notification panel 1020. When input to the output button 1030 is received, the control unit 170 may output the web page of a product to which the mobile coupon is applied or a web page for the settlement of the product to which the mobile coupon is applied. In some embodiments of the present disclosure, the control unit 170 may perform control so that a screen on which mobile coupon code has been input to a mobile coupon code input box is output when the web page for settlement has been output.

Figure 11:
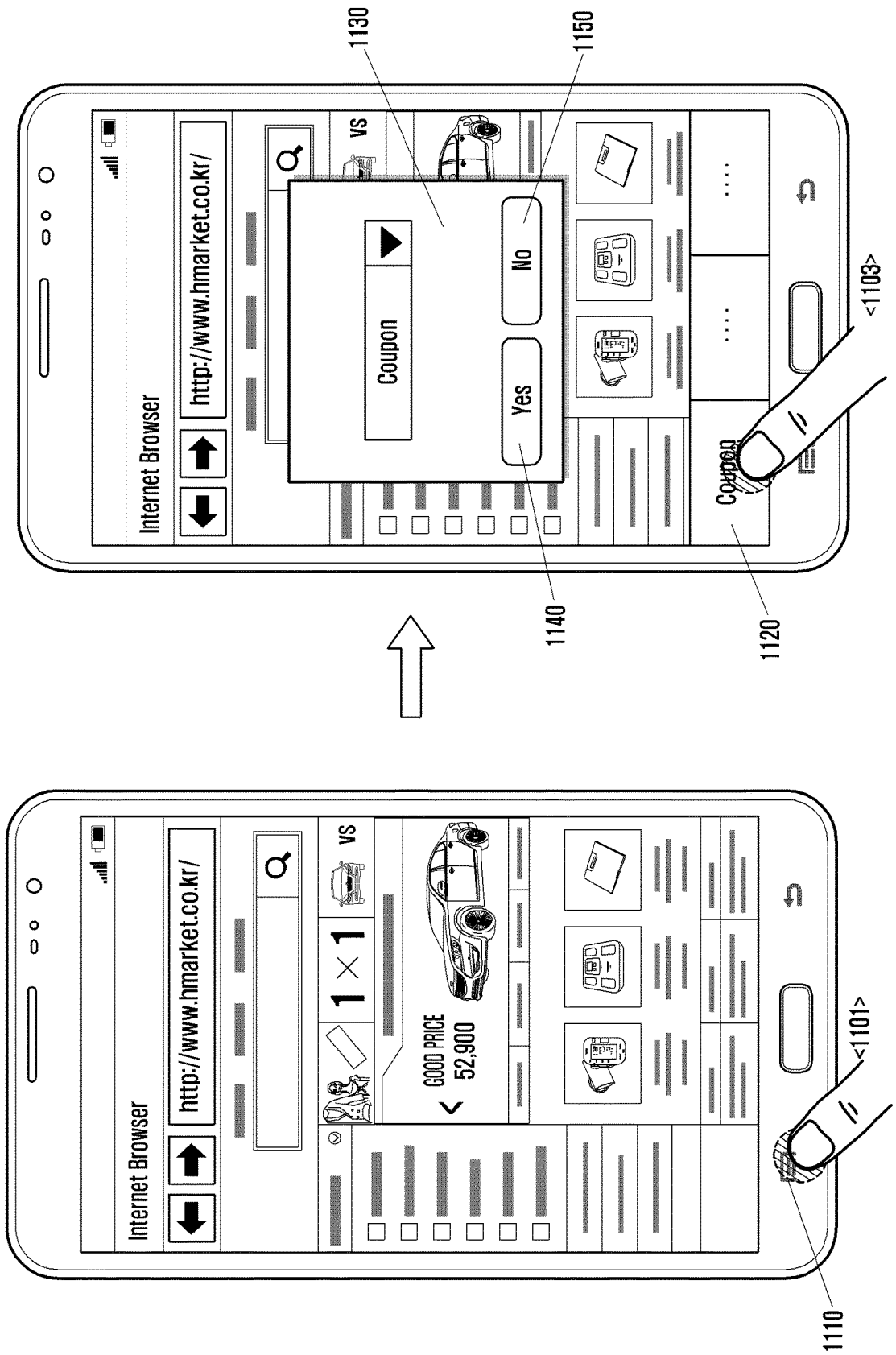
FIG. 11 is a diagram illustrating a method for outputting, by a mobile electronic device, a mobile coupon according to an embodiment of the present disclosure.

FIG. 11 is a diagram illustrating a method for outputting, by a mobile electronic device, a mobile coupon according to embodiment of the present disclosure.

Referring to FIG. 11, if the control unit 170 determines that the domain of an accessed web site is identical with a domain to which a mobile coupon is applicable and input using a menu button 1110 is received in screen 1101, the control unit 170 may output a button 1120 for selecting the output of the mobile coupon as a lower menu on the lower side of a screen, as in screen 1103. When input to the button 1120 for selecting the output of the mobile coupon is received, the control unit 170 may output information about the mobile coupon to a pop-up window 1130. In one embodiment of the present disclosure, when input to a button 1140 for selecting the mobile coupon within the pop-up window 1130 is received, the control unit 170 may directly apply the mobile coupon to a corresponding product. In contrast, when input to a button 1150 for not selecting the mobile coupon is received, the control unit 170 may perform control so that the output of the pop-up window 1130 disappears.

FIG. 12 is a diagram illustrating a method for outputting, by a mobile electronic device, a mobile coupon according to an embodiment of the present disclosure.

Referring to FIG. 12, if it is determined that the domain of an accessed web site is identical with a domain to which a mobile coupon is applicable, the control unit 170 may perform control so that a screen 1201 on which a web site is output is changed to a screen 1203 on which the mobile coupon is output in a pop-up window way when the web site has been output. In screen 1203, when input to a button 1220 for selecting the mobile coupon within a pop-up window 1210 is received, the control unit 170 may directly apply the mobile coupon to a corresponding product. In contrast, when input to a button 1230 for not selecting the mobile coupon is received, the control unit 170 may perform control so that the output of the pop-up window 1130 disappears.

FIG. 13 is a diagram illustrating a method for outputting, by a mobile electronic device, a mobile coupon according to an embodiment of the present disclosure.

Referring to FIG. 13, if it is determined that the domain of an accessed web site is identical with a domain to which a mobile coupon is applicable, the control unit 170 may perform control so that a screen 1301 on which a web site is output is changed to a screen 1303 on which the web site is output to a window 1310 on the upper side of the screen and information 1330 about the mobile coupon is output to a window 1320 on the lower side of the screen. For example, the control unit 170 may perform control so that a description of the mobile coupon, for example, information about a product, the discount conditions of the mobile coupon, and the effective date of the mobile coupon are output to the window 1320 on the lower side of the screen. Furthermore, the control unit 170 may perform control so that a button 1340 for selecting the mobile coupon is output. When input to the output button 1340 is received, the control unit 170 may output the web page of a product to which the mobile coupon is applied or a web page for the settlement of the product to which the mobile coupon is applied. In some embodiments of the present disclosure, the control unit 170 may perform control so that a screen on which mobile coupon code has been input to a mobile coupon code input box is output when the web page for settlement has been output.

Figure 14A:
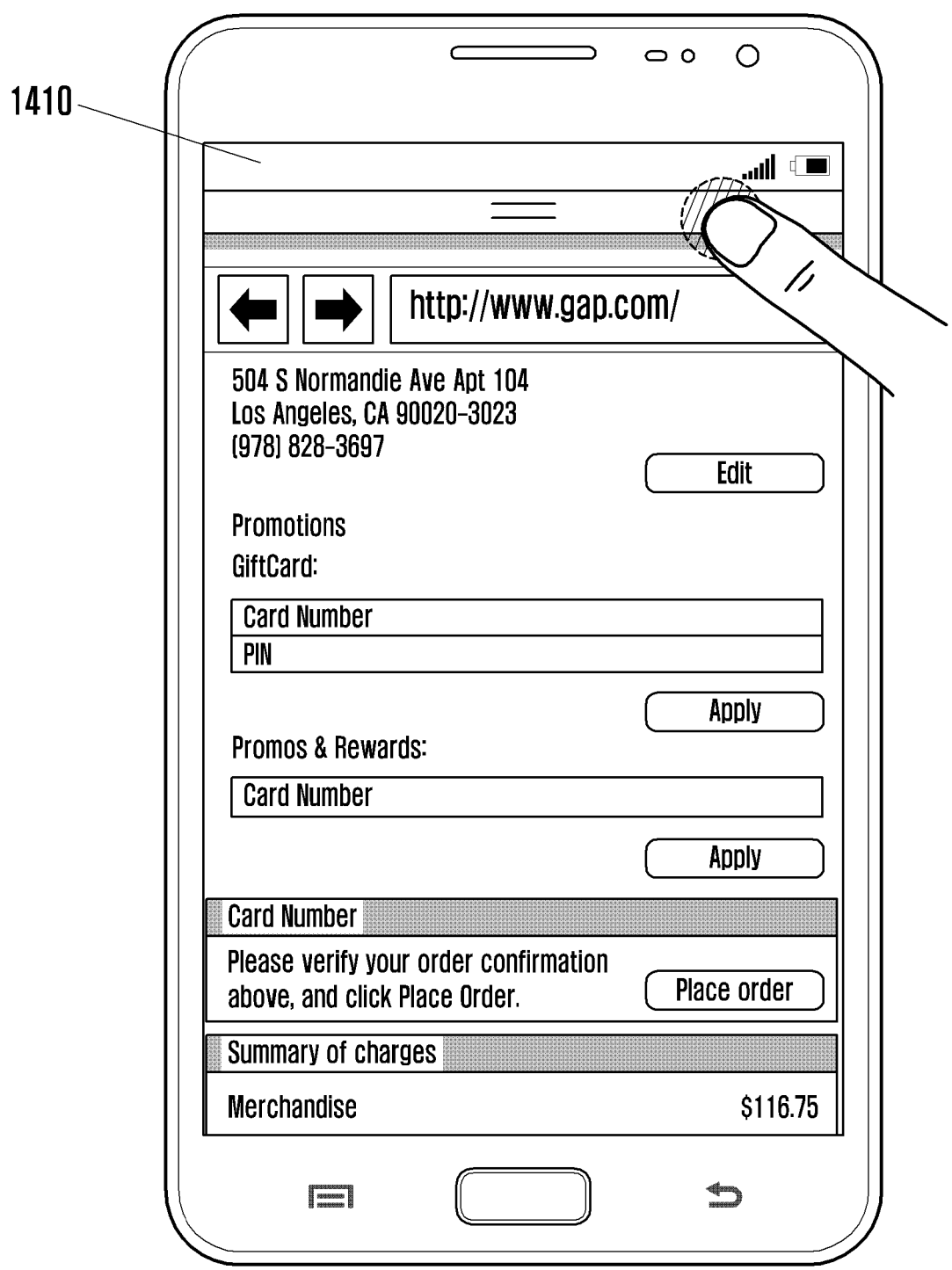
FIGS. 14A, 14B, and 14C are diagrams illustrating a validity determination of a mobile coupon in a mobile electronic device according to an embodiment of the present disclosure.
Figure 14B:
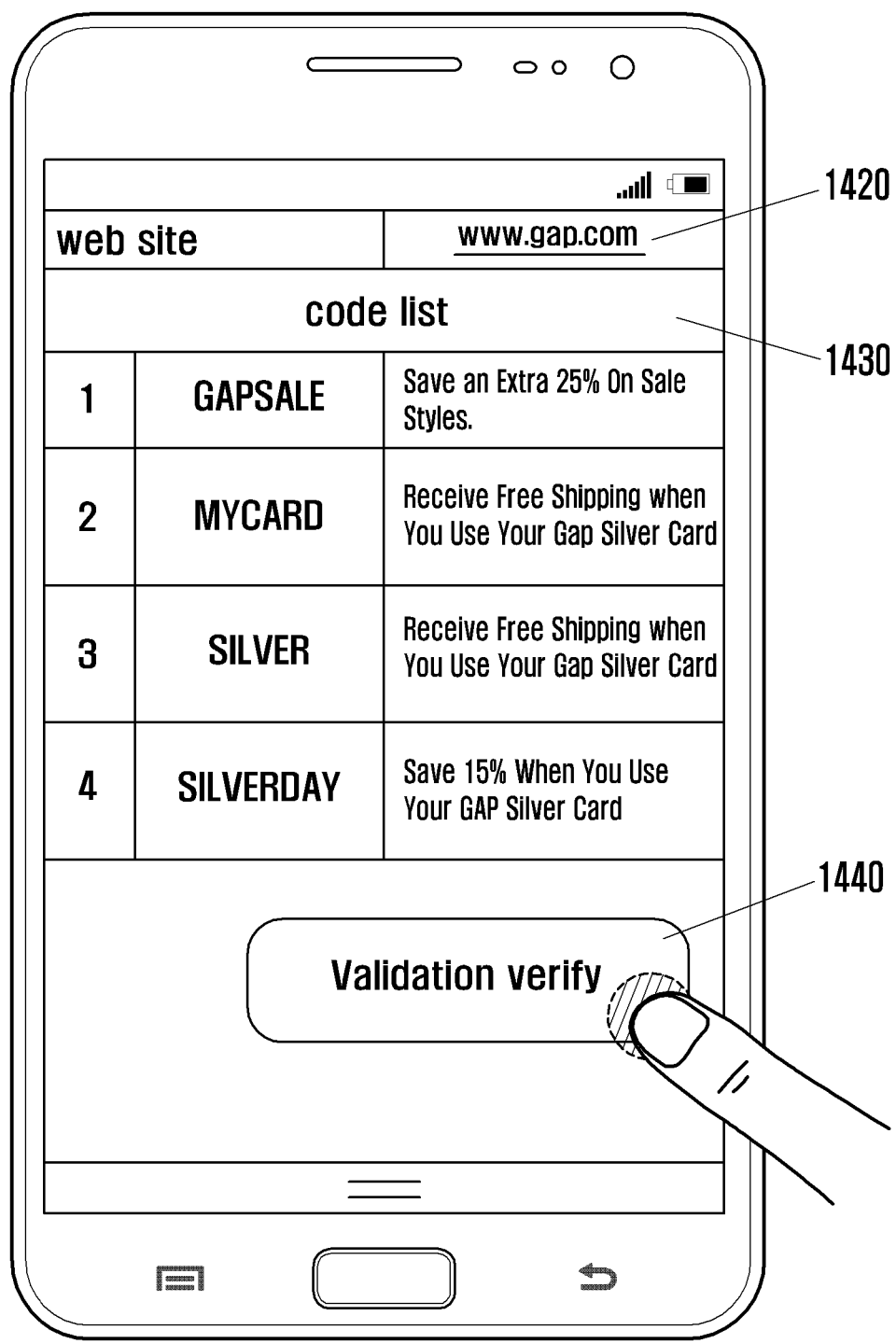
Figure 14C:
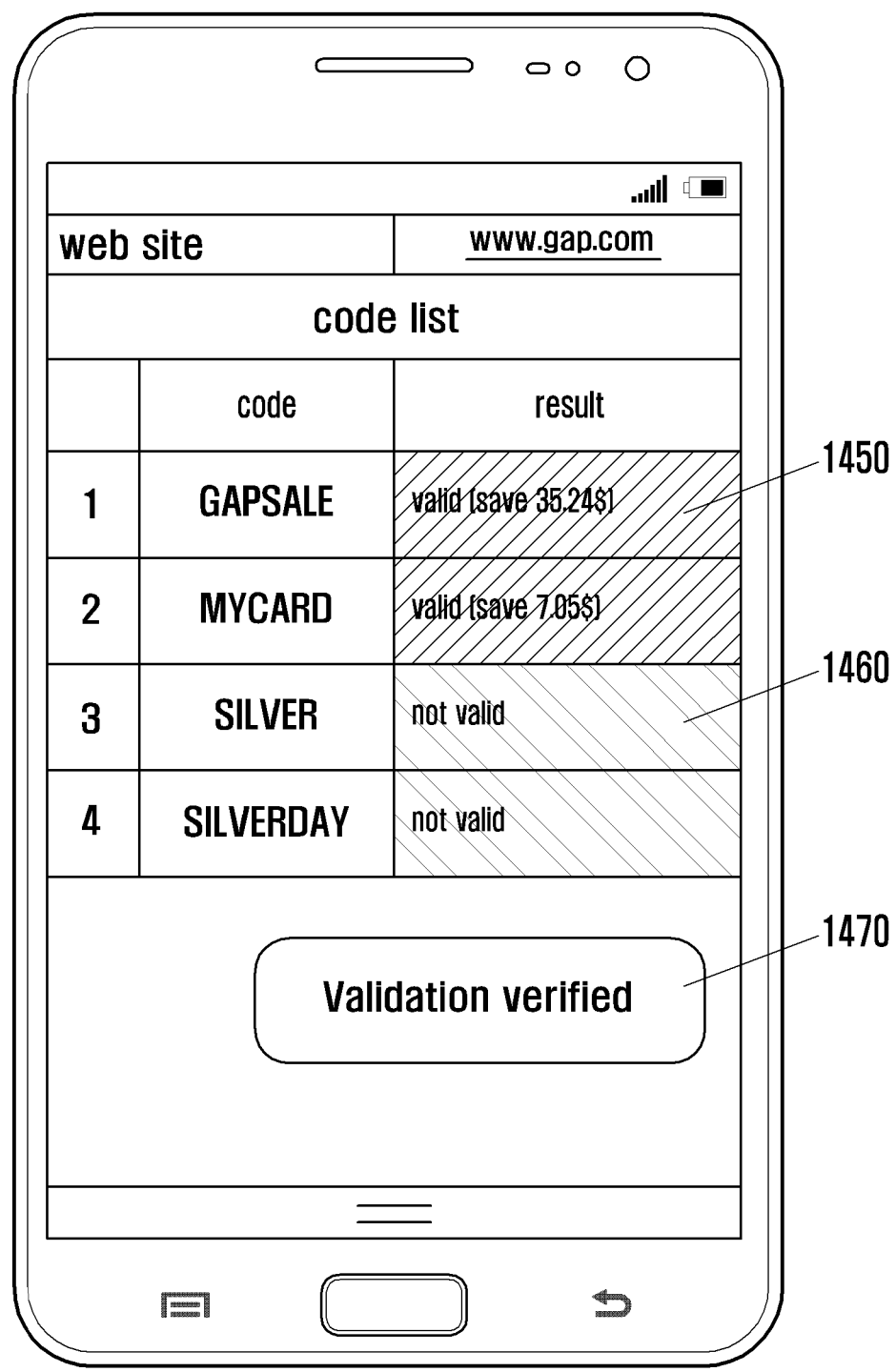

FIGS. 14A, 14B, and 14C are diagrams illustrating a validity determination of a mobile coupon in a mobile electronic device according to an embodiment of the present disclosure.

Referring to FIGS. 14A, 14B, and 14C, the control unit 170 may output a screen for the settlement of a corresponding product as illustrated in FIG. 14A. When a drag input to an indicator region 1410 is received when the screen for the settlement has been output, the control unit 170 may output a screen for determining the validity of a mobile coupon as illustrated in FIG. 14B. This is only illustrative, and the technical spirit of the present disclosure is not limited to the example. For example, the screen for determining the validity of the mobile coupon may be output in various ways, such as a pop-up window and a multi-window, in addition to the output according to the drag input to the indicator region 1410. In FIG. 14B, the control unit 170 may output information about a corresponding mobile coupon in addition to a mobile coupon domain 1420, a code list 1430, and may output a button 1440 for a validity determination. When input to the button 1440 for a validity determination is received in FIG. 14B, the control unit 170 may perform control so that a screen indicative of whether a mobile coupon is valid is output, as illustrated in FIG. 14C. For example, as illustrated in FIG. 14C, valid mobile coupon code corresponding to "GAPSALE" may be output to a result box 1450. In contrast, invalid mobile coupon code corresponding to "SILVER" may be output to a result box 1460. Furthermore, the control unit 170 may output a button 1470 indicative that a validity determination on a mobile coupon has been completed. Furthermore, in some embodiments of the present disclosure, a separate applet may be installed on an application related to a mobile coupon. In this case, the control unit 170 may perform control so that the validity of a mobile coupon is automatically determined.

As described above, in accordance with the methods of providing, by the mobile electronic device 100, a mobile coupon and the mobile electronic device 100 supporting the same according to various embodiments of the present disclosure, information about a mobile coupon is collected, whether the mobile coupon is applicable to an accessed web site is determined, and information about the mobile coupon is output if, as a result of the determination, the mobile coupon is determined to be applicable. Accordingly, excellent usability can be provided.

The aforementioned mobile electronic device 100 may further include a variety of additional modules depending on the type provided. More specifically, the mobile electronic device 100 may further include elements not described above, such as a short-range communication module for short-range communication, a camera module for capturing still images and moving images of a subject, an interface for enabling the mobile electronic device 100 to transmit and receive data using a wired communication method or a wireless communication method, an Internet communication module for performing an Internet function over the Internet, and a digital broadcasting module for performing a function for receiving and playing back digital broadcasting. The elements may not be all enumerated because they are modified in various ways according to the convergence trend of digital devices, but elements equivalent to the aforementioned elements may be further added to the mobile electronic device. Furthermore, it is to be noted that in the mobile electronic device 100 of the present disclosure, some of the elements may be omitted from the configuration or some of the elements may be replaced with other elements. This may be understood by those skilled in the art.

Some embodiments of the present disclosure have been described above through the specification and drawings. Although specific terms are used, the terms are merely used according to their common meanings in order to describe the technical contents of the present disclosure and help understanding of the present disclosure, and the present disclosure is not limited to the aforementioned embodiments of the present disclosure. For example, it will be evident to those skilled in the art that various embodiments based on the technical spirit of the present disclosure can be implemented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a mobile coupon in a mobile electronic device, the method comprising:
    obtaining a mobile coupon image regarding the mobile coupon, the mobile coupon image including a text or a trademark image;
    extracting, by at least one processor, domain information from the text or the trademark image;
    storing, by the at least one processor, the domain information with the mobile coupon image in a memory of the mobile electronic device;
    determining, by the at least one processor, whether the domain information corresponds to a domain of a web site accessed by the mobile electronic device;
    in response to determining that the domain information corresponds to the domain of the web site, outputting, by the at least one processor, information regarding the mobile coupon on a display of the mobile electronic device while displaying a screen of the web site accessed by the mobile electronic device; and
    in response to a user input on an area displaying the information, displaying a webpage for purchase of a product regarding the mobile coupon,
    wherein the displayed webpage includes a mobile coupon input area, and
    wherein a mobile coupon code included in the mobile coupon is automatically entered in the mobile coupon input area.

2. The method of claim 1, further comprising, in response to at least one of an input of a looped curve form on the mobile coupon image using an electronic pen, an input in which writing overlaps with an indication of the text or the trademark image using the electronic pen, or an input in which a line is drawn on the indication of the text or the trademark image using the electronic pen, determining a region including the text or the trademark image.

3. The method of claim 2, wherein the extracting of the domain information comprises estimating the domain of the web site based on information extracted from the region.

4. The method of claim 1, wherein the outputting of the information regarding the mobile coupon comprises outputting the information regarding the mobile coupon by using at least one of a notification panel method, a pop-up window method, or a multi-window method.

5. The method of claim 1, further comprising applying the mobile coupon to the web site.

6. The method of claim 1, further comprising determining a validity of the mobile coupon.

7. The method of claim 1, wherein the information regarding the mobile coupon comprises at least one of a mobile coupon code, information about a brand and the domain of the web site, an effective date of the mobile coupon, a discount rate of the mobile coupon, or coupon use conditions.

8. The method of claim 1, wherein the extracting of the domain information from the text or trademark image comprises extracting the domain information based on a user input applied to a portion of the mobile coupon image.

9. A mobile electronic device comprising:
    a transceiver configured to access a web site;
    a display; and
    at least one processor configured to:
        obtain a mobile coupon image regarding a mobile coupon, the mobile coupon image including a text or a trademark image,
        extract domain information from the text or the trademark image of the mobile coupon image,
        determine whether the domain information corresponds to a domain of a web site accessed by the mobile electronic device via the transceiver,
        in response to determining that the domain information corresponds to the domain of the web site, control the display to output information regarding the mobile coupon on the display while displaying a screen of the web site accessed by the mobile electronic device on the display, and
        in response to a user input on an area displaying the information, display a webpage for purchase of a product regarding the mobile coupon on the display,
    wherein the displayed webpage includes a mobile coupon input area, and wherein a mobile coupon code included in the mobile coupon is automatically entered in the mobile coupon input area.

10. The mobile electronic device of claim 9, wherein the at least one processor is further configured to, in response to at least one of an input of a looped curve form on the mobile coupon image using an electronic pen, an input in which writing overlaps with an indication of the text or the trademark image using the electronic pen, or an input in which a line is drawn on the indication of the text or the trademark image using the electronic pen, determine a region including the text or the trademark image.

11. The mobile electronic device of claim 10, wherein the at least one processor is further configured to estimate the domain of the web site based on information extracted from the region.

12. The mobile electronic device of claim 9, wherein the at least one processor is further configured to control the display to output the information about the mobile coupon by using at least one of a notification panel method, a pop-up window method, or a multi-window method.

13. The mobile electronic device of claim 9, wherein the at least one processor is further configured to apply the mobile coupon to the web site.

14. The mobile electronic device of claim 9, wherein the at least one processor is further configured to determine a validity of the mobile coupon.

15. The mobile electronic device of claim 9, wherein the information about the mobile coupon comprises at least one of a mobile coupon code, information about a brand and the domain of the web site, an effective date of the mobile coupon, a discount rate of the mobile coupon, or coupon use conditions.

* * * * *